US011223674B2

(12) United States Patent
Darby, III

(10) Patent No.: US 11,223,674 B2
(45) Date of Patent: Jan. 11, 2022

(54) EXTENDED MOBILE GRID

(71) Applicant: University of Louisiana at Lafayette, Lafayette, LA (US)

(72) Inventor: Paul J. Darby, III, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 103 days.

(21) Appl. No.: 16/044,848

(22) Filed: Jul. 25, 2018

(65) Prior Publication Data

US 2019/0068697 A1 Feb. 28, 2019

Related U.S. Application Data

(60) Provisional application No. 62/536,589, filed on Jul. 25, 2017.

(51) Int. Cl.
*H04L 29/08* (2006.01)
*G06F 9/50* (2006.01)

(52) U.S. Cl.
CPC ........ *H04L 67/1023* (2013.01); *G06F 9/5066* (2013.01); *G06F 9/5072* (2013.01);
(Continued)

(58) Field of Classification Search
CPC . H04L 67/1023; H04L 67/10; H04L 67/1036; H04L 67/12; H04L 67/34; G06F 9/5066; G06F 9/5072
See application file for complete search history.

(56) References Cited

U.S. PATENT DOCUMENTS 8,843,614 B2 * 9/2014 Yoon ..................... G06F 9/5072
709/224
9,600,553 B1 * 3/2017 Nigade ................ G06F 16/278
(Continued)

FOREIGN PATENT DOCUMENTS

CN 104933173 A * 9/2015
WO WO-2012104473 A1 * 8/2012 ............. G06F 1/329

OTHER PUBLICATIONS

P. Ferreira, L. Veiga and C. Ribeiro, "OBIWAN: design and implementation of a middleware platform," in IEEE Transactions on Parallel and Distributed Systems, vol. 14, No. 11, pp. 1086-1099, Nov. 2003, doi: 10.1109/TPDS.2003.1247670. (Year: 2003).*
(Continued)

*Primary Examiner* — Uzma Alam
(74) *Attorney, Agent, or Firm* — Lauren J. Rucinski; Russel O. Primeaux; Kean Miller LLP

(57) ABSTRACT

The E-MoG, i.e. Extended Mobile Grid, invention is herein described as a decentralized and distributed "Cyber-physical and/or Mobile Cyber-physical System," which may operate in connection with or semi-autonomous from or autonomously from the Internet, comprising a distributed homogeneous or heterogeneous plurality of wired and/or wirelessly interconnected stationary, portable, mobile, or self-mobile hosts, or devices, i.e. generically referred to as nodes, where the nodes' individual computation, communications, sensing, and/or actuation resources are collectivized for collaborative and/or collaborative-distributed computation and/or collaborative missions, i.e. mission processing, and/or collaborative-distributed missions, through the coordinating action of the E-MoG's distributed/decentralized software or middleware running onboard each node.

16 Claims, 6 Drawing Sheets

(52) U.S. Cl.
CPC .......... *H04L 67/10* (2013.01); *H04L 67/1036* (2013.01); *H04L 67/12* (2013.01); *H04L 67/34* (2013.01)

(56) References Cited

U.S. PATENT DOCUMENTS

| | | | |
|---|---|---|---|
| 9,684,546 B2* | 6/2017 | Peacock | G06F 3/04842 |
| 10,212,254 B1* | 2/2019 | Mahalingaiah | H04L 67/02 |
| 2003/0105654 A1* | 6/2003 | MacLeod | G06Q 10/10 |
| | | | 709/223 |
| 2012/0030683 A1* | 2/2012 | Kurdi | G06F 9/5072 |
| | | | 718/104 |
| 2014/0215487 A1* | 7/2014 | Cherkasova | G06F 9/5083 |
| | | | 718/106 |
| 2017/0220383 A1* | 8/2017 | Raj | G06F 9/4881 |
| 2018/0101399 A1* | 4/2018 | Jain | G06F 9/4881 |
| 2018/0107525 A1* | 4/2018 | Govindaraju | G06F 8/71 |
| 2018/0136976 A1* | 5/2018 | Ammari | G06F 9/4881 |

OTHER PUBLICATIONS

L. M. Pham and T. Pham, "Autonomic fine-grained migration and replication of component-based applications across multi-clouds," 2015 2nd National Foundation for Science and Technology Development Conference on Information and Computer Science (NICS), 2015, pp. 5-10, doi: 10.1109/NICS.2015.7302221. (Year: 2015).*
S. Chin, T. Suh and H. Yu, "Genetic Algorithm Based Scheduling Method for Efficiency and Reliability in Mobile Grid," Proceedings of the 4th International Conference on Ubiquitous Information Technologies & Applications, 2009, pp. 1-6, doi: 10.1109/ICUT.2009.5405741. (Year: 2010).*

* cited by examiner

EXTENDED MOBILE GRID

CROSS REFERENCE TO RELATED APPLICATION

This application claims priority to the U.S. Provisional Application No. 62/536,589, titled "Cyber-Physical System", which was filed with the United States Patent and Trademark Office on Jul. 25, 2017.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the EXTENDED MOBILE GRID, which may take the form of multiple embodiments. It is to be understood that in some instances, various aspects of the invention may be shown exaggerated or enlarged to facilitate an understanding of the invention. Therefore, drawings may not be to scale.

FIELD OF THE INVENTION

Figure 1:
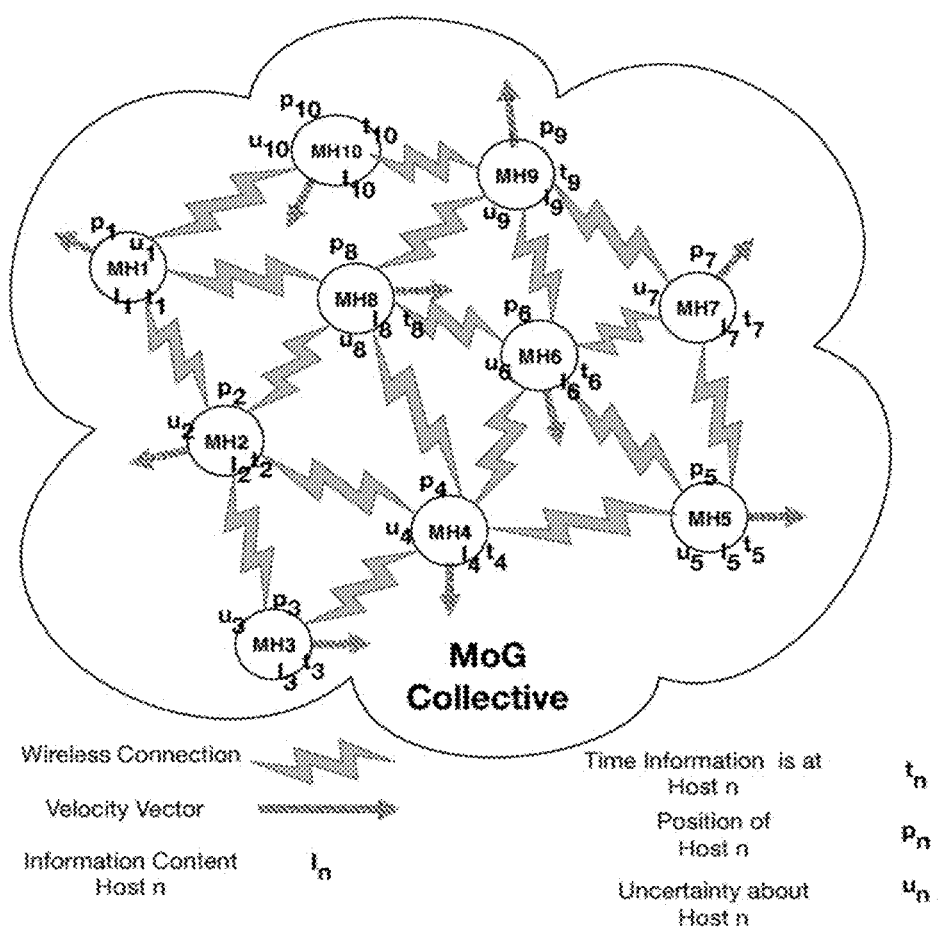
FIG. 1 provides a rendering of an example Extended Mobile Grid ("E-MoG") and the connections and variables in effect during operation that can limit performance.

The disclosed invention generally relates to the field of wired or wireless networks or clusters of devices or hosts, called nodes, with or without connectivity to the Internet, to form a system whose resources optionally may be coordinated to form a collective system where the nodes provide complementary and supplementary functionality for the purpose of carrying out some defined or automatically derived mission and where a temporal mission performance profile may be specified or derived within the mission period itself, so as to provide capabilities and enhanced synergistic functionality and performance not possible with said nodes acting alone or in uncoordinated groups. Nodes comprising the invention may themselves be comprised or configured as computers, smartphones, radios, robots, automobiles, boats or ships, planes, drones, battle tanks, satellites, and/or spacecraft, to name a few embodiments. The Nodes comprising the Extended Mobile Grid ("E-MoG") may be homogeneous or heterogeneous in configuration or design, but what all nodes comprising the invention have in common is their ability to host and/or provide computation to run the E-MoG's middleware, and tool or function-specific software, and their ability to communicate and hence to coordinate with their peer nodes, with optional additional functionality, but not limited to this functionality, such as mobility or self-mobility, sensors and instrumentation, power systems, and actuator arms or tools or even weapons.

Potential users of the disclosed invention includes, but is not limited to, first responders, firefighting, disaster investigation and mitigation rescue and recovery, traffic management, distributed composite scientific instrumentation in the context of exploration, experimentation, and the battle theater (land, sea, air, and space). The invention produces highly robust and resilient service quality supportive of service quality and performance.

BACKGROUND OF THE INVENTION

A traditional grid computing system involve clusters or groupings of high-powered servers interconnected by high-bandwidth and even fiber optic wired connections, where those servers collaborate under middleware orchestration, by each server processing some subtasks of a computational job or jobs, so as to offer parallel computing and hence, faster job processing. They may also offer some redundancy through checkpoints and replication of computational subtasks on a number of servers so as to increase job completion reliability within a specified time frame.

Checkpointing in traditional grid computing systems aids in job reliability, as it periodically saves a computational subtask's (process's) states, registers, stack pointers, and variable values as a snapshot. These snapshots may be transmitted periodically to servers other than the one currently running the subtask, in case the server running the subtask fails. Upon failure of the current server, i.e. during recovery, substitute servers that have received the transmitted checkpoints from the current server, may use the last good checkpoint received to restart the subtask or process that was running on the original server, at the point just prior to it failing, instead of having to restart the interrupted subtask from its very beginning, as would be the case were a checkpoint mechanism not in place. Jobs on traditional grid computing systems may run for hours, days, or even weeks so as to handle complex, distributed computation of a scientific nature. Checkpoints make it possible not to lose crucial processing work and time on these jobs, allowing work to be completed within more efficient time frames and with greater guarantee of completion even in the face of potential failures.

The Extended Mobile Grid (E-MoG) provides novel functions and enhancement of existing functions for dynamically scalable groups or clusters of devices (i.e. nodes) locally and globally with or without Internet connectivity. The invention addresses desired functions and practical, economical performance needs in science, the military, first responder operations, transportation management, security systems and networks, homeland security, public health, and potentially a number of other areas.

The E-Mog is a computationally-based an managed system composed of a homogeneous or heterogeneous plurality of wired and/or wirelessly interconnected computational stationary, portable, mobile, and/or self-mobile distributed devices (i.e. nodes) where said nodes have resources (i.e., optional degrees of computation, communication, sensing, and actuation capability) and where those resources singularly and collectively may be optionally and, to a dynamically-controllable degree, acquired, managed, controlled, scaled, profiled, and terminated by the system's decentralized communicating middleware (with middleware instances running on each node) so as to effect dynamically-scalable degrees of resource application in a planned or dynamically derived coordinated series of actions to provide missions (ranging from casual and scientific collaborative computing to collaborative distributed and composite instrumentation excursions to mission-critical operations requiring computation, communications, sensing and instrumentation, dynamic control, and even mobility and physical action, all parametrically tuned appropriate to the mission or missions at hand.

Missions may range from simple, short-term distributed computational jobs to gather data to mobile collective distributed sensing excursions or mission-critical distributed collective military operations involving physical coordinated collective actions carried out by the nodes. The E-MoG is dynamically scalable even during the course of a single mission to provide services ranging from the casual to mission-critical performance levels. Nodes comprising the E-MoG may be homogeneous or heterogeneous, but they generally have as a minimum, the ability to provide computation, and to communicate with some or all other nodes in the E-MoG so as to allow for their coordination and collaboration. Nodes comprising the E-MoG may optionally be comprised as a mix of computers, smartphones, radios, robots, automobiles, boats or ships, planes, drones, battle tanks, satellites, and/or spacecraft, to name a few embodiments. Moreover, the E-MoG is optionally comprised as a mix of stationary, portable, mobile, and/or self-mobile nodes.

The intent and purpose of the E-MoG is to provide both a methodical framework and key methods within the framework to achieve its function(s) practically. The E-MoG is intended to serve as a fully distributed, decentralized and mobile computation-based cloud or swarm of said nodes, capable of scaling from casual computing and/or mission processing all the way to mission-critical emergency or battle theater levels of same. It is capable not only of providing mission-critical distributed computing, but also in conjunction with the mission-critical computing, it is capable of providing physical mission execution where its computational nodes' resources are physically capable of sensing, computation, communications, and control-action and/or physical action, e.g. mobility and tool or sensor manipulation to name a few, either singularly or collectively. It is capable of operating as a cloud or swarm and a mobile cloud or swarm with varying degrees of connectivity to the Internet, ranging from full connection to the Internet to full autonomy, i.e. capable of operating without any connection to the Internet and/or in remote areas.

Mobility and concepts—ranging from cloudlets and mobile cloudlets, to smartphone grids, and collaborative robotics, distributed mobile and composite instrumentation, Vehicular Ad hoc NETworks (VANETS), and even collaborative munitions—are driving the functional need for the E-MoG. The E-MoG is implemented through the action of computational middleware, software that resides and executes on each node, and resources and manages a wired or wirelessly interconnected collective of devices (i.e. hosts or nodes) to support novel and critically-scalable services ranging from Mobile Collaborative Grid computing Services (MCGS) all the way to Mobile Collaborative Mission Processing Services (MCMPS).

A host or node may be stationary, portable, mobile, and/or self-mobile, but in any case, that host is characterized by its ability to provide or host computation, and to communicate either by wire or wirelessly with other hosts forming the E-MoG collective, and with those hosts managing the collective. A Mobile Host (MH) or Mobile Node (MN) requires the ability to compute, communicate and to move about, at will, and/or under control of the E-MoG collective. Nodes or hosts comprising the E-MoG may optionally consist of a mix of computers, smartphones, radios, robots, automobiles, boats or ships, planes, drones, battle tanks, satellites, and/or spacecraft and/or any of these and other embodiments capable of being equipped with or as a computing and communicating host, to name a few, allowing it to operate as a node in the E-MoG collective. Moreover, the E-MoG is optionally comprised as a homogeneous or heterogeneous mix of these node embodiments, where said embodiments may optionally be stationary, portable, mobile, and/or self-mobile under E-MoG control. The hosts described herein may be any stationary, mobile or portable device capable of computation, communications, and potentially other actions, such as self-mobility, sensing and interaction with other nodes, and with objects in the E-MoG's environment.

Applicable to a wide range of use cases, the E-MoG causes computation and collaborative computation, and other collaborative actions, among nodes, so as to effect control and distributed, collaborative processing of everything from small, short, computational jobs to full-blown and critical missions. In the case where a node is comprised as a Mobile Host (MH), the E-MoG utilizes the MHs themselves to provide the distributed computation, instead of offloading this function to a base station on a fixed wired network, as may be done traditionally. Importantly, the E-MoG is not only intended to support casual computational applications, but it is also intended to scale to support mission-critical Qualities of Service (QoS), and even full-blown missions, requiring tightly-coupled low-latency node-node interactions among node-distributed mission subtasks, i.e. where both mission subtasks and overall mission completion latency-response must be kept low. A typical E-MoG application may include, but is not limited to, an ad-hoc or otherwise wireless cluster of robots or drones, in the field, organized for some low-latency, and highly-interactive mission, remote from an Internet connection, where wireless peer to peer communications takes place via radio and/or other wireless means to allow middleware, running on these devices to coordinate and collectively implement the mission according to a required QoS profile.

The environment of traditional grid computing systems is not a mobile one, it is stationary and wired. While mobile devices can access Grid computing services, the computational resources is generally limited to the traditional servers on the wired network, and the computational resource does not generally extend into the mobile domain. It involves clusters of powerful stationary computing servers interconnected on wired and in many cases fiber optic networks, where both the servers and the network connections between them are highly reliable and offer both great computational power, and bandwidth respectively to both process and to facilitate the exchange of intermediate results produced by processing of the computing job's comprising subtasks. Because of the stationary environment of traditional grid computing systems, and since their communicating interconnections are reliable and of high bandwidth, these traditional systems don't need to consider physical or mobile actions, nor take into account unreliable wireless interconnections among nodes, and how mobility and/or node-node interference may affect these interconnections. Nor do they have to contend with the less powerful computers that may be found on portable or mobile devices. They also don't have to pay much attention to conserving power, as their servers do not derive their power from batteries. With respect to the executing jobs, these traditional computing systems only need to make computational scheduling, load balancing, and other decisions based upon computational resources and computational metrics and actions, e.g. available CPU cycles, computing memory and storage capability, and the like. Their decisions do not have to take into account, physical actions or mobility, or loss of wireless interconnections between MHs, or the power and computational limitations often found in the mobile environment.

As opposed to traditional grid computing systems, E-MoG jobs or missions may be relatively short in duration, ranging from mere fractions of a second to minutes, to hours and scaling to even longer time frames. And when considering the practical E-MoG described herein, performance-limiting challenges exist, as shown in FIG. 1.

The salient culprits are mobility and volatility of the devices or hosts, i.e. nodes, compromising the E-MoG, and the wireless interconnections between these nodes due in part to mobility. Entering and leaving the collective and/or roaming within the E-MoG collective at will, the nodes comprising the E-MoG may simply lose wireless connectivity with the E-MoG and/or with peer nodes within the E-MoG. Nodes hosting subtask computation or action may fail to exchange intermediate computation results with their collaborating peers, causing the overall job to be delayed or aborted altogether, if that job cannot be completed in an agreed upon time or with sufficient reliability. Moreover, depending upon the wireless conditions, and the degree of node mobility, these wireless links can be intermittently broken often, even during the course of a single job or mission.

In the face of such failures, practical support, scaling from the handling of just a computational job, up to Mobile Collaborative mission Processing Services (MCMPS) under the envisioned mission-critical use cases, requires subtasks running on nodes or mobile nodes in the E-MoG, to checkpoint frequently and for those checkpoints to be immediately stored on peer mobile nodes within the E-MoG itself. This approach offers relatively high checkpoint transmission bandwidth, to facilitate both low-latency storage and quick, flexible, local access to cached checkpoints during recovery of a failed computation or mission subtask. The E-MoG as described herein experiences varying degrees of node mobility and resulting changes in its wireless network topology with varying degrees of node-to-node wireless connectivity. Hence, on which nodes to store which checkpoints for optimal low-latency recovery, called the E-MoG's checkpoint arrangement, becomes a dynamic and important problem in the E-MoG, as opposed to the traditional grid computing systems. High mobility and dynamicity essentially requires the E-MoG to continually and rapidly reconfigure itself and its checkpoint arrangement automatically for best recovery, even during the course of a single short job or mission. This compelling need for rapid reconfiguration and recovery means the E-MoG must employ a wholly new paradigm for checkpointing and recovery as compared to traditional computing grids.

An entirely new functional computing paradigm is emerging, i.e. that of mobile wireless collaborative computing, spurred on by certain critical needs in every sector of our increasingly mobile society. These needs are evident by the rise of various, but related concepts like cloudlets, mobile cloudlets, smartphone grids, collaborative robotics, distributed collaborative mobile instrumentation, the Internet of Things (IoT), Vehicular Ad-hoc NETworks (VANETS), and even the express need by the United States military for collaborative munitions. In particular, the United States Department of Defense (DoD) has described projects such as the Rotocraft SIGINT/COMINT, that develops techniques to mitigate rotor blade induced radio multipath encountered during geo-location. It enables ad hoc networks of Rotocraft to rapidly characterize emitters. Unlike the traditional case, described E-MoG invention's new paradigm uses the mobile devices themselves (e.g. smartphones, small mobile computers, collaborative robots, and collaborative munitions to name a few), generically termed Mobile Hosts (MHs) or Mobile Nodes (MNs) as distributed and collaborative computational resources in the mobile environment, instead of just offloading computation from MNs to servers in wired Grids or the Cloud as is the traditional case.

Traditional wired grids and the Cloud provide high-speed networking and powerful servers for computation on big jobs and big data, a resource that generally cannot be matched entirely by grids composed of mobile hosts or nodes. But as effective and powerful as these traditional grid services may be, they can only provide a subset of the computational functionality critically needed in the mobile domain. The E-MoG is enabled by the confluence of our increasingly mobile society, and new powerful mobile computing devices, i.e. nodes. Small mobile computing devices like the smartphone, Raspberry PI, and RADXA computers the size of a credit card, are now just as powerful as desktop computers from just a few years ago. Add to this the fact that they standardly come with relatively high wireless bandwidth, sensors, and even general purpose I/O which can be used to control motors, mobility, and tools, and you get nodes that are able to sense, process sensed data, and take action of direct utility, all within the mobile environment itself to access Inherently Mobile Data (IMD). IMD is defined here to mean data that is produced in the mobile environment and best or only accessible to a mobile device or swarm or collective of mobile devices, i.e. nodes. Such IMD is considered to be remote from the traditional Grid services, where remoteness can be induced due to spatial, temporal, complexity, or scalability limitations of these traditional Grid services. Spatial remoteness is when the data or what needs to be processed or interacted with is too far away, especially away from Internet access, or in a place very dangerous or very difficult to access, i.e. outer space, the south pole, inside a damaged nuclear reactor, or when the phenomenon producing the data are too small, i.e. microscopic to be easily accessible, to name a few. Temporal remoteness is when the data or what needs to be processed or interacted with can be reached, but it cannot be reach quickly enough or with small enough latency to make dynamic real-time interaction practical, e.g. a rapidly changing phenomenon or process requiring real-time control, where the control system, due to its sluggish latency is effectively remote from the phenomenon or process. Complexity and scalability go hand in hand. If a phenomenon or process is remote in complexity and/or in scale, it may not be possible to provide sufficient tracking sensors or sufficient processing or control, or it may not be possible to bring sufficient resources to bear to the phenomenon in order to match its scale variation or complexity. Finally, remoteness can be induced due to combinations of spatial, temporal, complexity and scalability factors to varying degree.

Traditional grid and Cloud services may process data uploaded from mobile sensors in the field, to facilitate computational jobs for analysis or even to facilitate some non-real-time response back to a requesting mobile client (mobile node in the field acting as a mobile client). However, certain critical needs are arising in the mobile environment requiring some novel Grid computing functionality for which there is no sufficient solution in traditional Grid computing approaches. These critically needed mobile services generally require rapid or immediate "on the spot" sensing, distributed processing, high scalability, and reflexive interaction with IMD (inherently mobile data) in the mobile environment on behalf of a client or even a mobile client. Essentially, these services are characterized by low-latency tightly coupled interactive response among subtasks, and they may even include interactive sensing and control of complex and dynamically scalable distributed processes all within the mobile domain.

In trying to provide these critical services via traditional methods, i.e. by uploading mobile data from mobile sensors in the field, processing that data on traditional servers in wired Grids, and then trying to get a response back out to the mobile domain in sufficient time for nearly real-time interaction with mobile phenomena, traditional methods fall short. This is due to ever increasing challenges plaguing traditional systems. Firstly, computing servers in traditional wired Grid or Clouds where the processing is done, are now located an increasing number of hops away from mobile wireless access points, and hence are further, time-wise, from the mobile field sensors. Secondly, these same hops are becoming increasingly more congested with inbound and outbound traffic making them not able to scale well with prolific increases in mobile sensing devices. Thirdly, traditional methods face both increasing levels of security and an increasing number of security checkpoints between sensors and processing servers. What all this means is that traditional methods will face round-trip closed loop latencies and latency variations that make tightly coupled interaction with mobile data and mobile phenomena infeasible, effectively temporally remote, and the problem is not getting any better.

Moreover, there are many scenarios where the traditional method of a mobile device submitting sensed or other data for processing to the Grid or Cloud and then waiting for a processed response, simply will not work. Some scenarios simply place mobile devices out of range of wireless access points, i.e. spatially remote. Examples include collaborative vehicular computing in Vehicular Ad hoc NETworks (VANETS) where infrastructure may be out of service or even non-existent. Other examples include collaborative robotics or collaborative drones used to explore remote locations, or to assist in emergency situations where infrastructure is down, nonexistent, or not economically viable. Still other scenarios include mission-critical situations involving first responders in disasters or rural areas, or even collaborative munitions where provision of a protected or working infrastructure is not practical. The traditional scenario of the computational Grid involves a client submitting a long-term big computation job to the Grid for distributed processing, and then waiting for minutes, hours, or even days for results. This is not the target use case or niche addressed by the Extended Mobile Grid (E-MoG) which involves short jobs or missions ranging from mere seconds to full blown missions, with tightly-coupled interaction.

DETAILED DESCRIPTION OF THE INVENTION

The E-MoG resources and manages a wired and/or wirelessly interconnected collective of Hosts and Mobile Hosts (MHs) i.e. Nodes and Mobile Nodes (MNs) to offer novel but critically needed low-latency distributed computation-based services both in the non-mobile and/or in the mobile environments. Applicable to a wide range of use cases, these services offer local and immediate nodal collaboration on a job's distributed subtasks so as to provide computing and other mission-critical services via the node and/or mobile node devices themselves as a collective resource, instead of only offloading mobile node computation to the traditional wired services like the cloud or wired-Grid. These E-MoG services are expected not only to support casual applications, but they are expected also to scale to support mission-critical qualities of service (QoS) involving tightly-coupled low latency interactions among subtasks, i.e. where both subtask and overall job latency must be kept low.

The E-MoG offers computation within scalable wired and/or wirelessly-interconnected clusters of collaborating nodes characterized by short-term distributed jobs or missions lasting from mere seconds to minutes or longer. Typically client work submittal is followed by the expectation for local, immediate, or tightly-coupled interactive response both between dependent distributed subtasks and for the job as a whole. The E-MoG's computational missions may be composed of a sequence of short mission-critical distributed jobs or subtasks whose goal is mission completion within negotiated service qualities and where computation scheduling, data migration, checkpoints and the like, must often take mobility or even commanded mobile action into account. The E-MoG's missions or short computational jobs usually involve data that is inherently mobile, i.e. data that is generated, processed, and requires quick reflexive and interactive system response all within the mobile environment, i.e. Inherently Mobile Data, IMD. For example, the E-MoG may be employed in the context of a distributed composite instrument to acquire IMD not available by other means. These scenarios may require the MoG to reflexively adjust in real time, its sensing and computational resolutions so at to match the IMD phenomenon or phenomena under study, allowing it to adequately capture and process fleeting mobile or other data.

Under these scenarios the complexity, dynamicity, or widely distributed location exhibited by the mobile phenomenon or phenomena under study may render it remote with respect to the traditional Grid sensing and computation methods. This is because these traditional methods suffer from round-trip responsive latencies that are relatively high and access points that are relatively centralized. Such situations require low latency, the distributed agility to achieve significant interactive complexity, and the ability to scale reflexively in node-to-node interaction time, node-to-node distance, and computational or mission accuracy as needed. The E-MoG offers reflexivity as a methodology of achieving its negotiated service quality. Reflexivity is herein defined to be that characteristic whereby the nodes are able to coordinate so as to 1) measure the service quality they are collectively delivering, 2) determine if their achieved collective service quality meets or exceeds the negotiated service quality required, and 3) make adjustments to spatial, temporal, or scalability/complexity resolution so as to compensate and improve performance.

The basic computational services provided by the E-MoG are termed Mobile Collaborative Grid Services (MCGS), and with the E-MoG, they may be scaled to become or provide Mobile Collaborative Mission Processing Services (MCMPS). It is these services that comprise the subset of new Grid computing services generally, that is the salient and relatively exclusive domain of the E-MoG. The E-MoG is comprised as just a physical entity or any one physical implementation, like for example a smartphone Grid.

Instead it is primarily a composite set of distributed and decentralized middleware functions applying more broadly to a wide range of use cases involving collaborating node and/or mobile nodes. Not requiring any special hardware for implementation, its components are software and/or hardware functional modules running atop the native operating systems of the wired and/or wireless nodes. Through the E-MoG's node-to-node communications and distributed processing, its middleware becomes aware of, acquires, allocates, self-organizes, and coordinates available nodal resources collectively, managing these resources dynamically on behalf of a Client-Agent (CA). The CA too is either a singular or distributed function in the E-MoG. It is capable of running on any participating node or nodes as the case may be, or a proxy gateway or set of proxy gateways to facilitate access to the E-MoG both from mobile clients and clients on traditional wired systems like the Grid or Cloud services. This way, the E-MoG may augment or extend the reach of functionality for the traditional Grid or cloud too.

Figure 2:
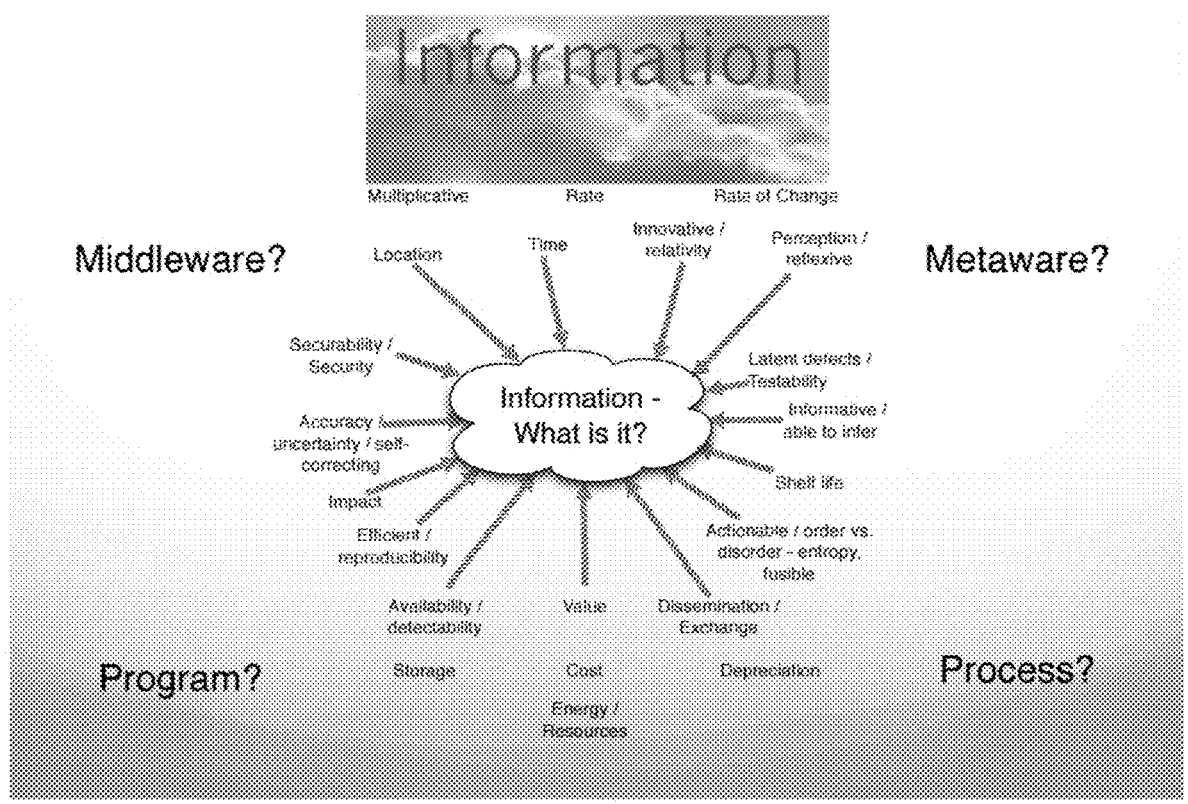
FIG. 2 is a visual representation of all the attributes that "information" is considered to have in the context of the E-MoG.

In the context of the E-MoG, "information" is defined broadly as the "difference that makes a difference." Under this broad definition, information may be both a descriptor of some metric and the physical embodiment of the metric itself. For example, the data describing the momentum of an object or even the relative momentum of an object would be considered information. But the actual momentum or relative momentum of the object itself would also be considered information. Information is a relative concept and is capable of being recorded and altering the outcomes of programs. In the context of the E-MoG, information is defined to have a number of attributes as shown in FIG. 2. Information attributes are further described in subsections.

Information Attribute: Information has a value. The value of information may be small or large, and its value may be of monetary, entertainment, appreciation, allow the completion of some goal, task or mission, or be of generic resource type, but under the E-MoG paradigm, the information must have some value to some entity, in order for it to be defined as information. The value of information is relative both to the information and its type and to the transmitting and receiving entity associated with the information. Information may be cached or stored, transmitted, received, and/or exchanged or even deleted. Information may undergo lossy or lossless compression. The process of information exchange, just like the exchange of stocks at the stock exchange, may increase the value of the information, or change its value. For example, if node 1 has A, and needs a copy of B to complete its task, and node 2 has B and needs a copy of A to complete its task, an exchange between node 1 and node 2 would increase the value of the node 1-node 2 system. Hence, node 1 would send a copy of A to node 2 and node 2 would send a copy of B to node 1, and now both nodes could complete their tasks. The E-MoG applies mechanisms to maximize the value associated with information and/or information transaction, according to the needs, goals, and negotiated service quality profiles of the mission being conducted, during the course of the mission.

Information has a cost. There is a cost associated with information when it must be managed. The processing of information, the storage of information, the transmission of information, the receiving of information, and even the deletion of information all carry some cost, e.g. time, memory, energy, monetary, lost alternatives to name a few. The E-MoG applies mechanisms to minimize the cost associated with information, according to the needs, goals, and negotiated service quality profiles of the mission being conducted, during the course of the mission.

Information may be disseminated or exchanged, at a cost, and such dissemination and/or exchange may change the value of the information. The E-MoG applies mechanisms to maximize both the dissemination and/or exchange of information, and/or the value of that information dissemination or exchange, according to the needs, goals, and negotiated service quality profiles of the mission being conducted, during the course of the mission. The receiver(s) may be a node or human or a mixture of same.

Information may depreciate or appreciate over time, but in either case its value can be affected by the passage of time. Information has a shelf life, where it may depreciate. But, some information such as old literature, can increase its value over time. Information has a time dependent value, and one can maximize information value by delivering it to the recipient "just in time" when it is most useful. Deliver it too early and the information is not as valuable, because it is not currently needed and it has to be stored. Storage has a cost. Deliver it too late and it may be too late to take action. Hence, "just in time delivery" tends to maximize information value. The E-MoG applies mechanisms to control the depreciation of information, according to the needs, goals, and negotiated service quality profiles of the mission being conducted, during the course of the mission.

Information may be to varying degree immediately actionable, i.e. useful in completing some task or deriving some value. The E-MoG applies mechanisms to maximize the degree to which information is actionable, according to the needs, goals, and negotiated service quality profiles of the mission being conducted, during the course of the mission. The receiver may be a node or human.

Information has some entropy level. According to the scientific definition, informational entropy is a measure of the degree of disorder in the information. Under the E-MoG paradigm, we consider and define E-MoG-entropy, where E-MoG-entropy is relative to the receiver or viewer of the information, and the entropy value depends on what the receiver or viewer is looking for or expecting. Hence, the entropy could be low for receiver A, and relatively high for receiver B, for instance. For example, the bit pattern 11111111 may traditionally be considered to have a lower informational entropy since it appears to have more order, than the bit pattern 10101010. However, if receiver A has 10101010 and is trying to find a match, receiving 10101010 would produce ayes on all bits, whereas receiving 11111111 would produce a ynynynyn on the bit pattern received, with evidently less order. Hence A, according to its internal representation, considers the pattern 10101010 to have a lower E-MoG-entropy than 11111111. Hence, A has found order in the disorder. This E-MoG-entropy is part of the E-MoG invention paradigm. Under this model, we have a concept similar to a key fitting to a lock. When the key fits we have a low or minimum E-MoG-entropy, regardless of the complexity or apparent disorder of the key. The key fitting the lock allows some task or mission to be competed. The E-MoG applies mechanisms to minimize or maximize information E-MoG-entropy, according to the needs, goals, and negotiated service quality profiles of the mission being conducted and the intended receiver, during the course of the mission. The receiver may be a node or human. For example, the goal during a battle theater scenario may be to minimize the E-MoG-entropy to friendly nodes, and maximize the E-MoG entropy to enemy ones.

Information has some fusibility, i.e. the quality or capacity to be fused with other information. In the context of the E-MoG, fusibility is a relative term, and depends on the information from the multiple parties being fused and the mechanisms used to fuse the information. The act of fusing information can change its value, and fusing information is capable of deriving value from the information being fused, or increasing its value. The E-MoG applies mechanisms to maximize information fusibility, according to the needs, goals, and negotiated service quality profiles of the mission being conducted, during the course of the mission. The receiver may be a node or human.

Information has a quality termed innovativeness. Innovativeness is that attribute that quantifies or qualifies how new the information is. Innovativeness is a relative term and depends upon the receiver and the information. A certain piece of information may be new to receiver A, but not new to receiver B. The E-MoG applies mechanisms to maximize information innovativeness, according to the needs, goals, and negotiated service quality profiles of the mission being conducted, during the course of the mission. The receiver may be a node or human.

Informativeness is the degree to which information being disseminated or exchanged, informs. Informativeness is a relative term and depends upon the information being disseminated and the receiver. Informativeness depends upon the degree to which the receiver is able to understand or decode the information combined with the degree to which the information is innovative or new to the receiver. The E-MoG applies mechanisms to maximize information informativeness, according to the needs, goals, and negotiated service quality profiles of the mission being conducted, during the course of the mission. The receiver may be a node or human.

Location is an important attribute of information. E-MoG not only applies mechanisms not only to process information, and disseminate information, but to process it and disseminate it at the most valuable location, according to the needs, goals, and negotiated service quality profiles of the mission being conducted, during the course of the mission.

Time is an important attribute of information. E-MoG not only applies mechanisms not only to process information, and disseminate information, but to process it and disseminate it at the most valuable time, and/or time periods, according to the needs, goals, and negotiated service quality profiles of the mission being conducted, during the course of the mission. This applies to latency, and variance in latency associated with information transmission and arrival.

Security is that attribute of information that provides a method and mechanisms to keep it out of the hands of unintended parties. Security applies both to the data wanted to be secured and metadata about the data wanted to be secured. E-MoG not only applies mechanisms to appropriately secure information, according to the needs, goals, and negotiated service quality profiles of the mission being conducted, during the course of the mission.

Securability is that attribute of information, based upon its source, its content, its volume, its representation and other factors, not limited to these, that determines how easy it is to make secure, and to keep it out of the hands of unintended parties. Securability applies both to the data wanted to be secured and metadata about the data wanted to be secured. E-MoG not only applies mechanisms to appropriately secure information, but it also applies mechanisms to attempt to maximize the securability of the information, according to the needs, goals, and negotiated service quality profiles of the mission being conducted, during the course of the mission.

Accuracy is that characteristic of information that specifies its degree of correctness. The difference between the reported value and the correct value is the error. E-MoG applies mechanisms to appropriately ensure the accuracy of information, according to the needs, goals, and negotiated service quality profiles of the mission being conducted, during the course of the mission.

Uncertainty is that characteristic of information that describes the degree to which the recipient should consider the information as speculative, and/or the degree to which the recipient should increase the confidence interval associated with the information. E-MoG applies mechanisms to appropriately minimize, maximize and/or control the uncertainty of information, according to the needs, goals, and negotiated service quality profiles of the mission being conducted, during the course of the mission.

Self-correctability is that characteristic of information, based upon its context, and representation (e.g. encoding) that describes the degree to which the recipient can detect, correct, and/or supplement or infer so as to come to the correct conclusion of what the information content should be. For example the word with missing letter, i.e. "d_gs," in the phrase "barking d_gs," could be solved by the receiver by applying a context algorithm, and hence is to a certain degree, with the appropriate algorithm, self-correcting, provided the receiving node has the appropriate algorithms and/or methods to detect and correct the received information. E-MoG applies mechanisms to appropriately ensure the self-correctablity of information by control of either the information representation, its context, and/or to whom it is sent, according to the needs, goals, and negotiated service quality profiles of the mission being conducted, during the course of the mission.

Impact is that characteristic of information that describes the degree to which it affects and is important to system outcomes. It is a relative concept and pertains not only to the content, but when and where the information is delivered, and also to the number, scale, and diversity of receivers that receive it. E-MoG applies mechanisms to minimize, maximize and/or appropriately control the impact of information, according to the needs, goals, and negotiated service quality profiles of the mission being conducted, during the course of the mission. (workflow priorities applied to information with highest impact).

Latent Defects is that characteristic of information that describes the degree to which it is likely to contain hidden errors. E-MoG applies mechanisms to maximize the likelihood of hidden errors being made visible, according to the needs, goals, and negotiated service quality profiles of the mission being conducted, during the course of the mission.

Testability is that characteristic of information that describes the degree to which it is structured so that it can be tested or checked for errors, either in content, or in function in the case where the information is a program, or program portion. E-MoG applies mechanisms to maximize testability of information, according to the needs, goals, and negotiated service quality profiles of the mission being conducted, during the course of the mission.

Storage and Replication Efficiency is that characteristic of information that describes the memory size, processing footprint, energy footprint, transmission footprint, time footprint, location footprint, securability footprint, security footprint, cost and value footprint with which information can be stored, and/or replicated. E-MoG applies mechanisms to maximize the storage and replication efficiency of information, according to the needs, goals, and negotiated service quality profiles of the mission being conducted, during the course of the mission.

Processing and Transmission Efficiency is that characteristic of information that describes the efficiency with which that information may be processed and/or transmitted. It depends upon a number of factors, including but not limited to its representation, location, the time, and the intended number of recipients. E-MoG applies mechanisms to maximize the processing and transportation efficiency of information, according to the needs, goals, and negotiated service quality profiles of the mission being conducted, during the course of the mission.

The information Approximation Degree is that characteristic of information that describes the degree to which the information is an approximation of an actual value. The greater the Approximation Degree, the more the information becomes an approximation, and the less significant it is with respect to the actual value. For example, a number representing some measurement, A, having more significant figures would have a smaller Approximation Degree, while if the same measurement had fewer significant figures, it would have a greater Approximation Degree. But this doesn't just pertain to measurements, but also to calculations, and to best effort dissemination tries, to name a few. For example, a command may go out from the E-MoG to do a best effort try to disseminate information to all of 10 recipient nodes, with Approximate Degree of 3. In this case, if dissemination could be achieved to all but 3 nodes, then it is considered satisfactory, at Approximate Degree 3, since approximately all nodes have been disseminated to. The benefit here is in support of speed and efficiency, in achieving a service quality that is good enough, as a tradeoff to gain speed and efficiency.

The information executability is that characteristic of information that describes the degree to which the information is can be executed as a computer program, or as a physical program, or as a hybrid computer-physical program. This is an assessment by the E-MoG as to whether and how it should treat the information, i.e. do we execute it or not.

In the context of the E-MoG, a "program" maybe a written program by some author or authors (programmers), intended for execution on a computer, or it may be a natural program or unintentional program, e.g., a physical location and orientation of objects, set up in the physical world, such that a certain natural sequence of events take place when the first physical event is triggered. A program is execution, i.e. a program that has started running, is termed as a "process." A process may be intended, i.e. in the case it is the execution of a written program, or it may be unintended, in the case its execution results naturally. But whether an intended or controlled process, or a natural and unintended process, the process may or may not reside inside a computer. It can be a cyberspace process or a process out in the real world. In the E-MoG paradigm, the process is not limited by the bounds of the computer, it can exist in part or in whole in the physical world. In the E-MoG, cyberspace processes, physical processes, and hybrid mixes of cyberspace and physical processes all are considered processes, i.e. considered to have resulted from programs, and are in fact programs in execution. For example, a corruption of some intended program may result in an unintended process running inside of a computer. However, if that computer controls a robot, then the unintended process may cause unintended physical processes to occur, such as damaging a part that was intended for installation. Move the robot arm the wrong way and you may accidentally set the tumbling of a natural chain of dominos (a physical program). Hence both intentional and unintentional programs may cause processes in cyberspace and/or in the physical world. Hence, both intended and unintended programs may exist in cyberspace, in the physical world or in both. The other salient point in the E-MoG paradigm, is that intentional and unintentional programs (or processes), and cyberspace and physical programs (or processes) may affect each other, altering outcomes of each other.

In the context of the E-MoG, "resources" is also broadly defined. The E-MoG invention model, puts resources into three (3) categories, i.e. 1) Direct Resources, 2) Virtual Resources, and 3) Environmental Resources. Regardless of the category, all resources may have computational and/or physical impact and may be characterized and computational or physical. For example, remaining CPU cycles of a host would be a computational resource, whereas the node's velocity or relative velocity with respect to its neighboring nodes in the E-MoG or some object in the environment, would be categorized as a physical resource.

Direct resources include the local information a node has about itself, i.e. its own location, velocity, acceleration, heading, orientation, antenna orientation, onboard sensor inventory and functional status, onboard actuator or tools inventory and functional status, its functional inventory and its software inventory and functional status, its capability for self-mobility and its performance capability, its CPU cycles, computer type model, its available memory and execution queue, its communications queue, communications capability, its Computationally Augmented Random Linear Network Coding (CA-RLNC) working set, its subtask results data cache, its subtask residue information cache, its remaining subtask completion time, its battery capacity and other local power resources, not limited to those described above. The results residue, while the result of a publishing node's subtask execution or action, includes a physical result as opposed to only a data result. For example, a subtask may as part of a mission, be required to drive a robot from Point A to Point B. But it is certainly possible that the subtask may fail to execute fully, with the result that the robot was driven only half the distance between A and B, etc. The portion of the physical subtask result progress, and left for a replacement subtask to finish and or attempt to finish, is termed the programmatic residue, or simple the residue. It may be the case that a replacement subtask can employ the residue as a resource in some way, say to sense an object that is close to B, even though the robot is not already at B and has not completed the subtask. In this case the robot may be able to nevertheless sense object B by employing both the residue, i.e. it journey to object B partially complete, and a special tool which can sense from a distance, hence using these two resources combined to accomplish the task. For the residue to be utilized it must be known as a resource through sensing or approximating calculations.

Virtual Resources include reported information a node has received about its neighbors, i.e., their host location, relative location, velocity, relative velocity, acceleration, relative acceleration, heading, relative heading, orientation, relative orientation, antenna orientation, relative antenna orientation, onboard sensors, relative onboard sensors, onboard actuators, relative onboard actuators, self-mobility capability, relative self-mobility capability, CPU cycles, relative CPU cycles, computer type and memory, relative computer type and memory, execution queue, relative execution queue, communications queue, relative communications queue, communications capability, relative communications capability, wireless connectivity strength, relative wireless connectivity strength, RLNC working set, relative RLNC working set, CA-RLNC working parameters, relative CA-RLNC working parameters, subtask results data cache, relative subtask results data cache, residue information cache, relative residue information cache, available remaining subtask completion time, and available remaining subtask completion time relative to other important events, i.e., but not limited to battery capacity, relative battery capacity, and other local power resources, and relative power resources, with respect to neighbors (neighboring nodes).

Environmental Resources include reports or directly learned information of pertinent objects or phenomena in the environment that may be utilized as resources in completion of the mission, of relevance to the node itself or to its neighbors. These also include reports of the detection and nature of mission relevant objects, relative to resources of neighbors (and their relative resources) and environmental resources, relative to resources of neighbors (and their relative resources). For example: sunlight in a given area near an E-MoG mission is considered an environmental resource, as it may be used to derive energy via a node's solar panels.

The E-MoG's support for Mobile Collaborative Grid computing Services (MCGS), scalable to include Mobile Collaborative Mission Processing Services (MCMPS), means that it must offer distributed collaborative computation and missing processing services locally, in the mobile environment, with a wide range of service qualities, i.e. QoS. Hence, MCGS and MCMPS are required not only to support casual applications, e.g. low-latency browsing as in the case of cloudlets, but they also need to support both computational jobs and full-blown missions of a mission-critical nature, scaling as needed, e.g. for use cases such as these, but not limited to these use cases, i.e. VANETS, and Land Warrior. Mission-critical applications often demand service qualities that guarantee low-latency combined with tightly-coupled interaction among subtasks, with some level of reliability guarantee for the mission as a whole.

The E-MoG allows the Client-Agent (CA) to request the processing of some distributed job or mission and to negotiate a QoS Temporal Profile (QoS-TP) for that job or mission on the MoG's nodal collective. Granting of the CA's request depends both upon the CA's authorization and whether or not collective nodal resources sufficient to the CA's requested QoS-TP are projected to be available for reservation during the mission's requested interval. If the request is granted, the MoG acquires nodal resources and dynamically manages those resources collectively appropriate to the task at hand, working to complete the job or mission within the negotiated QoS-TP.

Figure 3:
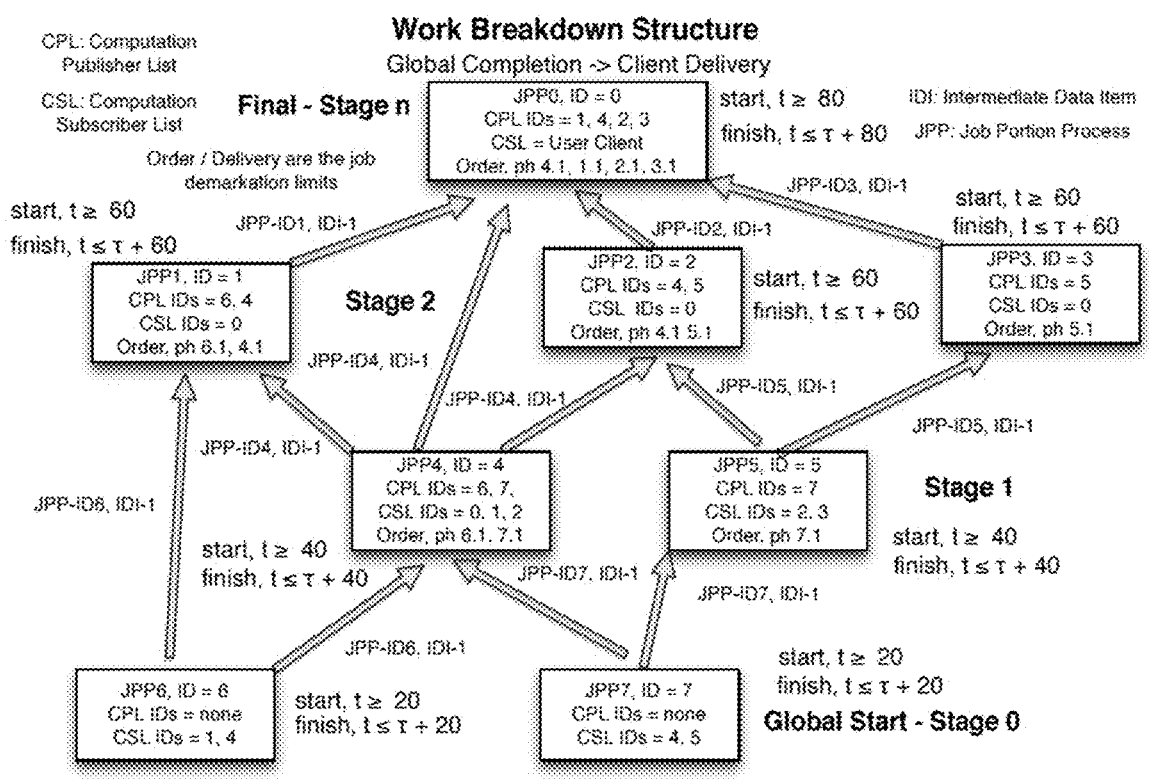
FIG. 3 depicts a Work Breakdown Structure showing the Job or Mission subtask relationships and product flow in the E-MoG.

Here the term, mission is preferred as opposed to job. This is because the word job tends to connote only processing and associated services, i.e. communications, storage memory, and printing, traditionally associated with computational work. On the other hand, a mission may consist of some hierarchical Work Breakdown Structure (WBS) showing subtasks and their processing and dependency relationships (See FIG. 3). But unlike a job, a mission's subtasks are not all computational. The mission's WBS may certainly include a number of short computational jobs or subtasks requiring subtask functions such as processing, communications, and storage memory, as expected. But a mission is also just as likely to include physical functions or physical processes or processing, i.e. other action applicable primarily to mobile nodes. These include movement, locomotion, flight, mobile sensing, navigation, location, controlling grabbers, firing weapons, and other subtasks not traditionally considered when scheduling traditional computation. It also includes interaction with physical phenomena. This is especially true when nodes happen to be robots, vehicles with onboard computers, moving smartphones on a person or in vehicles, and other similar mobile or self-mobile capable devices. Hence a mission is a WBS involving a mix both of computational and non-computational and/or physical actions. This domain is where the E-MoG functionality extends via mechanisms described herein to provide Mobile Collaborative Mission Processing Services (MCMPS).

In this new processing paradigm, these non-computational subtasks or processes nevertheless have substantial locational and temporal bearing upon computational scheduling, processing, data storage, checkpoints, replication, and communications for instance. Under this mission processing approach for example, a node's current location relative to an object it is moving toward, whose image it needs to capture, will have bearing as to when its image analysis software must be loaded and executed. Hence, the node's location and speed may be just as important to the big picture of computational resource scheduling as CPU availability. It is self-evident here that resources in the case of the E-MoG must be more broadly defined than in the traditional computational sense. Hence, it is argued here that to optimize the big picture in the case of the E-MoG, a mission processing approach must be employed so as to take relevant non-computational subtasks and resources into account.

The E-MoG's implements work in the context of a MCMPS Mission according to a hierarchical work Breakdown Structure (WBS), where data or action dependencies between a mission's constituent subtasks are specified (See FIG. 2). In the WBS, each subtask is both a consumer and a producer of data or some mission action. Those subtasks producing the data or mission action needed both other subtasks are termed publishers (or producers), from the perspective of subscribers, i.e. subtasks needing to consume the published or produced data or mission action. A mission subtask cannot complete its execution to publish or produce data or action for its subscribers until it has consumed the input data or input action it needs, i.e. the data or action produced by its publishers.

When it comes to data or action dependencies, the mission's subtasks are generally not equal. Some are more dependent than others, needing data or action from more or a larger number of publishers. Likewise, upon execution, the published or produced resultant data or action of some subtasks may be more extensively utilized by dependent subtasks in the mission than the published or produced relevant data or action of other subtasks. In other words, some mission subtasks are more important than others by way of their interdependencies with other subtasks in the mission. The makes these subtasks more important with respect to the success of the entire mission. Since, for a given mission, subtasks may be distributed for execution on any number of available nodes, loss of wireless connectivity between publishers and subscribers may lead to loss of mission failure because of unfulfilled data or action completion delinquencies.

CASE is the E-MoG invention's novel Checkpoint-Assisted Speculative Execution replication-recovery method for Extended Mobile Grid Computing provided by the E-MoG. CASE is a fully decentralized middleware component of the E-MoG supporting subtask replication through its Resource-aware Variable Approximate Checkpointing (R-VAC) methodology. Because of the nature of MCMPS, many of the mission's subtasks may be adequately recovered or replicated using approximate checkpoints, i.e. checkpoints that convey the subtask's approximate state or status. Using status derived from a subtask's checkpoints, CASE proactively decides upon the degree of replication with respect to subtask execution and interdependent data or action, with priority given to subtasks and data or action having greater number of WBS subtask interdependencies.

With CASE, a subtask executing on a given node, may have its approximate status relayed to other nodes where received checkpoints there may be used by the E-MoG middleware running on those receiving nodes to make subtask and data or action replication decisions, i.e. the receiving node decides whether or not to replicate or partially replicate and execute the subtask it essentially received from the received checkpoint. Because of the inherent communications latencies in the global E-MoG (node hop to node hop), as it scales, uncertainty will prevail at some point sufficiently distant from any event generating information to be used in making decisions. Hence, CASE makes replication decisions locally, i.e. at the replicating node, and from the perspective of the replicating node, examining both need and prospects for successful replication and delivery of data results before committing to replicate. Among the factors used to assess both need and prospects for replication, are data and task or action dependencies and the importance of the subtask and its data or action in the WBS, and the status of publisher-subscriber connections of the failing subtask in question, and for the prospective node.

CASE is efficient; it utilizes checkpoints to facilitate replication (of mission subtasks). It may either fully or partially replicate subtasks to varying degree, allowing replication at smaller granularity where needed for efficient scheduling. This way, if the node on which a given mission subtask, say Subtask A, appeared likely to fail near the midpoint of Subtask A's execution, Subtask A would not have to be replicated form the beginning (fully replicated), but only the portion of Subtask A, i.e. from the most recent good checkpoint, would need to be speculatively replicated. This partially replicated subtask is generally easier to "fit" in the schedule queue of the replicating node, making it more probable that the replicating node has room for it. In addition to speculative partial replication, CASE also supports Resource-aware Variable Approximate Checkpointing (R-VAC) and Resource-aware Approximated Speculative Replication (ASR) from those checkpoints. For example, in the situation where the E-MoG may be comprised of a swarm of robotic mobile nodes, if one robot is approaching some object to pick it up and carry it to another location, and that robot is perceived by CASE to be likely to fail in its subtask, the subtask can be approximately replicated on another robot. If the failing robot were for instance, 20.5 cm from the object, the second robot, assuming the first robot's duties, need not also be placed at exactly the 20.5 cm position (especially if remaining mission time or other resources are strained) but an approximate distance may be specified as good enough, saving both checkpoint communications time and computation time, and moreover saving time on the physical replication of the failing mission subtask. These time-saving measures can be important, especially when the E-MoG has to scale to larger numbers and/or criticality of its mission, where low latency is of prime concern.

CASE's form of approximate checkpointing considers not only the subtask state but also the state of its wireless interconnections with publishers and subscribers. An important feature and capability of CASE is that a mission subtask need not already be executing to be checkpointed, i.e. it may be in a prestart or pre-execution state. CASE may scale to be progressively proactive in this regard, allowing checkpoints to report status on subtasks that are scheduled for execution, but not yet started. This way allows the subtask to be replicated somewhere else, and aborted on the checkpointing host if it looks like the subtask in question, i.e. preparing to execute, will be poorly connected to its publishers and subscribers upon start, or will not be in a position to complete its designated mission subtask upon start.

CASE employs a novel Resource-aware Variable Approximate Checkpointing (R-VAC) methodology whose broadcasts are utilized to support speculative proactive replication of a mission's distributed subtasks and data to the degree needed to achieve the mission's specified service quality profile under the E-MoG's available host resource constraints. It is important to note here that CASE not only supports speculative, proactive replication of the mission's distributed subtasks, but also temporally and proximally stages and replicates both the input and output data, and in some cases, mission actions, i.e. the intermediate data and/or actions used and produced by those subtasks respectively.

Figure 4:
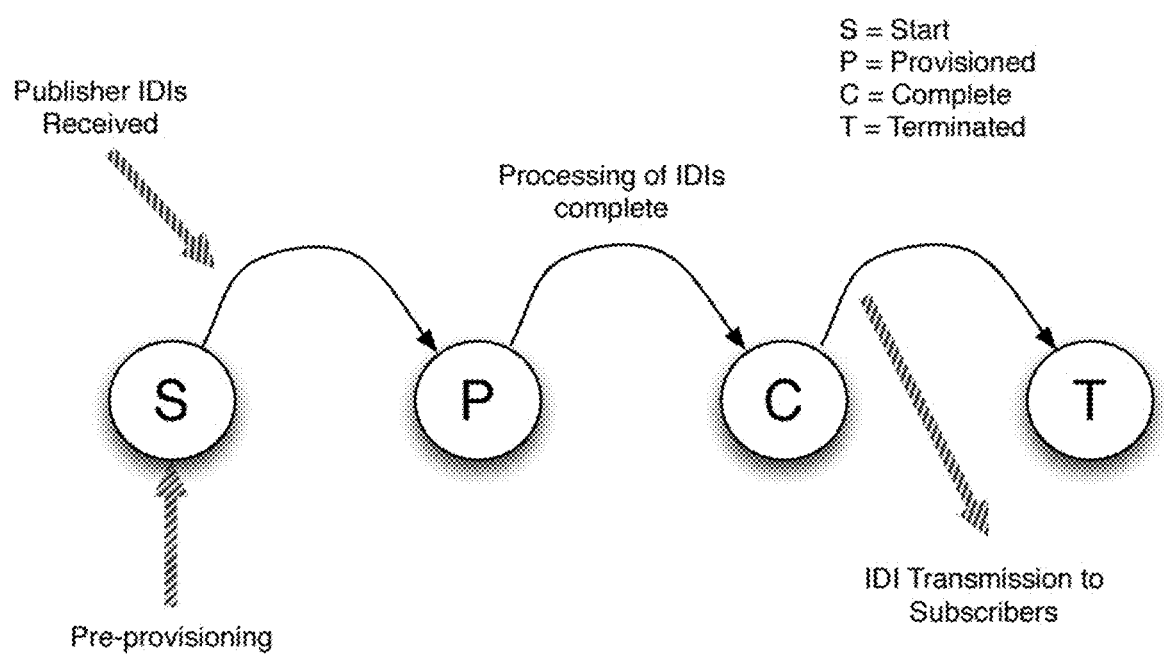
FIG. 4 is a diagram demonstrating Job Portion Process ("JPP") State Transitions.

In considering the processing of MCMPS missions on E-MoG resources, the underlying collaborating work effort, called its Work Breakdown Structure (WBS), may reasonably be modeled as a linear-hierarchical workflow of data and/or action dependent stages in the form of a Directed Acyclic Graph (DAG). The mission's distributed subtasks, each termed a Job Portion Process (JPP), collaborate according to predefined data dependency flows. Referring again to FIG. 3, each JPP is uniquely identified by its ID number, e.g., in the case of FIG. 3, 0 through 7 as shown. Additionally, the mission's WBS specifies unique minimum start and maximum finish times for each JPP, and designates sets of other JPPs (by ID number) supplying input data or action to it, and expecting input data or action from it, called its publisher and subscriber JPP(s), respectively. Critical collaborative messages, called Intermediate Data Items (IDIs), or alternatively Intermediate Action Items (IAIs), are transmitted from or produced by publisher JJPs to and for their ISI or IAI dependent subscribers. To allow for atomic simplicity in the WBS, we assume that a given JPP is only defined between its starting time (State S), and the time at which it broadcasts or produces its single IDI or IAI and/or for its subscribers (completion State C), followed by its termination (i.e. State T), as shown in FIG. 4.

The WBS is not a physical structure, but a descriptive flow of work, with subtasks organized by stages, and the subtasks themselves, apportioned to JPPs. Also described are the data and/or action dependencies among JPPs as well as QoS requirements such as latency and reliability, agreed upon prior to global MCMPS mission commencement. Here, during initial scheduling, an assumed E-MoG low level scheduler negotiates the WBS and its QoS with the E-MoG's RAR; i.e. its Resource Acquisition and Release Module. It is at this point that the WBS is mapped onto a set of nodal resources for collaborative execution on the E-MoG. Being QoS-aware, the RAR attempts to map regularly collaborating JPPs onto neighboring nodes. Normally each JPP is mapped onto a single and separate node where resourced permit, but it is possible that up to k JPPs may be scheduled to run on the same node, concurrently or sequentially.

Identified salient failure mechanisms related to execution of JPPs on the E-MoG include 1) input IDI(s) or IAI(s) from a JPP's publishers cannot be received or accessed within the expected actionable time, i.e. $t_E$ (within sufficient time to allow both processing and resultant IDI delivery to subscribers or to a client within WBS latency requirements), and 2) insufficient computational network or other resources because of concurrent scheduling, insufficient nodes, or congestion, i.e., a JPP cannot complete processing and delivery of its resultant IDI or IAI to subscribers or to a client within WBS latency requirements. The E-MoG is volatile, and without checkpointing, recovery, or replication measures, IDI transmission failure alone, i.e. separate from latency related failures, ensure an exponentially decreasing probability of MCMPS mission completion.

Given sufficient network resources, traditional concurrent replication of collaborative mission subtasks (JPPs) provides a way to achieve the mission's required completion reliability without realizing significant increase in latency, owing to both its proactive nature and no need to detect failures. However, it is generally very wasteful of network resources, often a very limited commodity in the E-MoG. On the other hand, simple checkpoint-assisted recovery (CAR) is not proactive, but reactive in nature, and hence, while it may be more conservative with network resources, it has significant potential to increase latency. With CAR, we must first detect failures and then attempt to find resources to recover, followed by the recovery process itself. Actual failure detection is difficult as often a portion of the network used in the detection process is itself not working, and hence failures can be missed altogether. Acquisition of resources during recovery too, can take considerable time, as resources may be unavailable since CAR only triggers recovery upon an unplanned event, namely the failure. Hence, although CAR may consume fewer E-MoG resources as it only commits to utilizing these upon detected failure, it will likely not achieve the favorable reliability or latency results achieved by traditional replication.

The proposed CASE method, utilizes the power of originating and forwarded information carrying checkpoints 1) to facilitate failure prediction a priori, 2) to speculatively act in advance of predicted failure to implement recovery through partial replication of JPPs (and/or physical actions), by projecting recovery success likelihood using hypothetical replacement hosts, and 3) by providing a distributed monitoring, control, and speculation trim mechanism, to intelligently limit consumption of E-MoG and E-MoG network resources. CASE seamlessly integrates the checkpointing process with failure prediction and a proactive-speculative replication-recovery scheme to ensure recovery, where only the remaining subtask time need be replicated, and where system resource utilization is monitored and controlled and where over-utilization is kept in check by a novel distributed methodology called Direct Node Ancestry (DNA).

Figure 5:
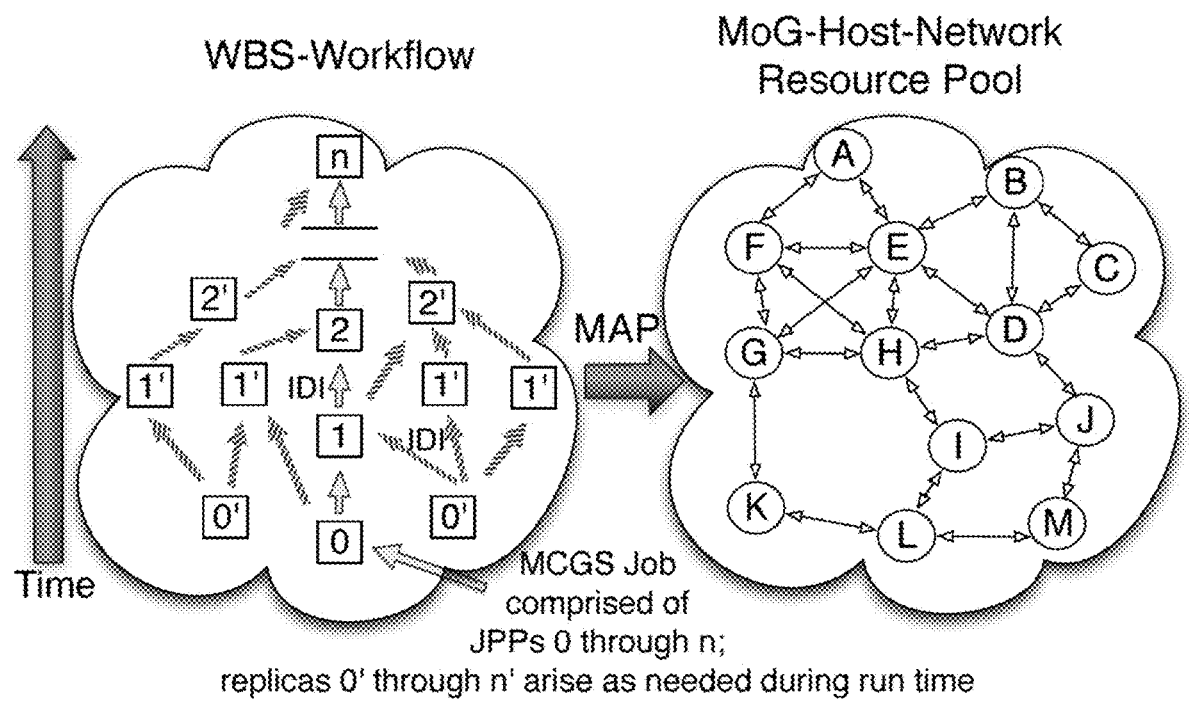
FIG. 5 provides an example of Work Breakdown Structure mapping or scheduling on a set of mobile hosts (A through M) in an E-MoG.

As an example, consider FIG. 5, depicting the mapping of the WBS (Work Breakdown Structure) onto a set of nodes, i.e. Node A through Node M comprising an E-MoG instance, which is not limited to these or this number of nodes. What is shown on the left-hand portion of FIG. 5 is a simple, singular and scalable linear hierarchical-staged workflow, shown in the form of a Directed Acyclic Graph (DAG), with JPPs, i.e. 0, 1, 2, ..., n, to be assigned to nodes (right-hand side of FIG. 5) for collaboration to complete an MCMPS mission. Prior to commencement of the mission, and during the negotiation phase, the E-MoG's low level scheduler maps the workflow to nodes in the E-MoG, choosing, for example nodes G, H, D, and E, to implement workflow stages (in this case synonymous with JPPs), 0, 1, 2, and 3, where stage JPP 3, i.e. here the final stage in the example, attempts to deliver global mission results to the client, at Stage n. Also depicted in the figure are partially replicated mission subtasks (or sub-actions) (PRs) of JPPs, i.e. 0', 1', 2', etc., respectively where a PR is defined as a replica started from the last good or most appropriate checkpoint available at a self-selected replicating node, preferably a different one form that hosting the original. Replicas are not scheduled prior to mission commencement, as are original JPPs, but instead arise during run time, as a result of CASE's predictive mechanisms pertaining to failure and speculative recovery-replication success probabilities. That being said, once the mission has commenced, the need for replicas may be anticipated by CASE and subtask replicas may be scheduled even in advance of the start of the original subtask from which the replica is based in situations where original subtask failure is deemed likely.

Consider a staged hierarchical workflow (with typical as depicted in FIG. 5). Here it is anticipated that each stage will be done within some discrete designated time interval. It is assumed that the number of such intervals within each stage will be finite, and hence the number of stages is also finite. During the runtime interval associated with each stage, a finite number of replicated sub-tasks or sub-actions are mapped to some subset of E-MoG hosts for execution, as needed to achieve client QoS requirements, to the extent that judicious use of network computational resource allow. A mapping of specific JPP replicas and partial replicas (of sub-tasks or sub-actions), i.e. JPP-PRs to specific nodes during a specific interval, is termed a hyper-path, and its completing resultant, i.e. the delivery of the JPP's Intermediate Data Item (IDI) and/or Intermediate Action Item (IAI) to the JPP's subscriber(s), is termed a hyper-vertex, where we have a finite number of hyper-paths and hyper-vertices, due to a finite number of nodes and a finite number of stage intervals.

Now, it is noted that selected hyper-paths to hyper-vertices may or may not be feasible, as network congestion, or competition or unavailability of sufficient concurrent computational or actionable or other resources may prevent meeting latency or reliability QoS as specified by the client upon that path selection. Hence, the mission's computation or processing can be modeled as a directed graph, consisting of uniquely chosen hyper-paths linking a series of unique hyper-vertices, and where the initial vertex represents the idle state, encountered both at job or mission start and returned to job or mission completion.

Because each hyper-path may or may not be feasible, depending upon scheduling choice, this problem is called Hyper-Path Feasibility, i.e. HPF. A well-known NP complete problem is the Directed Hamiltonian Cycle, i.e. DHC. It is contented that DHC can be transformed into HPF in polynomial time, as stated in Theorem 1 below. Theorem 1: HPF is NP-complete. The following steps constitute the proof:
1. Given a graph of vertices and edges, DHC determines if a Directed Hamiltonian Cycle exists, i.e. a cycle where each vertex is visited exactly once. In this problem, pairs of vertices with an edge between them have a distance of 1, while those who do not, have distance infinity ($1|\infty$).
2. Lemma 1. DHC has been shown to be NP-complete.
3. Given a certificate graph with a chosen set of hyper-paths (edges) traversing hyper-vertices (vertices), we can check path feasibility in each case, and hence in polynomial time we can determine if we do in fact have a solution to HPF. Therefore HPF is in NP.
4. Transformation of DHC into HPF. It is noted that the scheduling of node-set A at time $t_i$, followed by node-set B at $t_{i+1}$ whose execution is completed over hyper-path A→B, is not identical to the scheduling of node-set B at time $t_i$ followed by A at $t_{i+1}$ over hyper-path B→A. This shows that the direction does matter, and hence HPF can only legitimately be represented using a directional graph. Now, it can simply be noted that each ($1|\infty$) edge in DHC can be directly represented by or mapped into a feasible or infeasible hyper-path in HPF. All transformations included above require no more than polynomial time to complete.

5. Theorem [Brassard]. Let X be an NP-complete problem. Consider a decision problem Z, where Z E NP, such that X is polynomial (Turing) reducible to Z. Then Z is also NP-complete.
6. By Lemma 1, HPF is NP-complete. According to Item 3. HPF∈NP. Further DHC $$\leq \frac{P}{T}$$

HPF, hence HPF is NP-complete. This completes the proof.

The actual E-MoG problem, i.e. that of anticipating host interconnection failures in a dynamic mobile E-MoG, predicting failure probability, and subsequent prediction of recovery success probability in the context of hypothetical and partial replication choice is a more difficult problem. This is especially true since there is inherent uncertainty in the basic information used to assess likelihood of failure and for making recovery replica scheduling decisions. To make these decisions, the E-MoG attempts to take into account direct and indirect indicators of both network congestion, and concurrent and planned JPP execution or task action. The E-MoG's predictive method hence must work over several stages to find a viable solution within the context of the client's latency and reliability QoS specification.

Assessment information used in making decisions can be delayed or lost in wireless transmission. In a distributed system like the E-MoG, decisions made at time t2 and position S2 cannot be optimal when based on information sensed at time t1 and position S1. Hence, under these conditions no optimal singularity with respect to achieving QoS requirements can ever be achieved. The best problem solution that can be worked toward is to determine whether such required QoS is feasible. However, as the NP-complete proof shows, this problem does not scale well, being too computationally complex to perform via exhaustive methods, MoG, where latency in rendering would make such exhaustive methods and their resultant decisions impractical. Therefore, the E-MoG employs a heuristic, where quick, low-latency, suboptimal solutions are much preferred over the quest for optimal, long-running ones.

Figure 6:
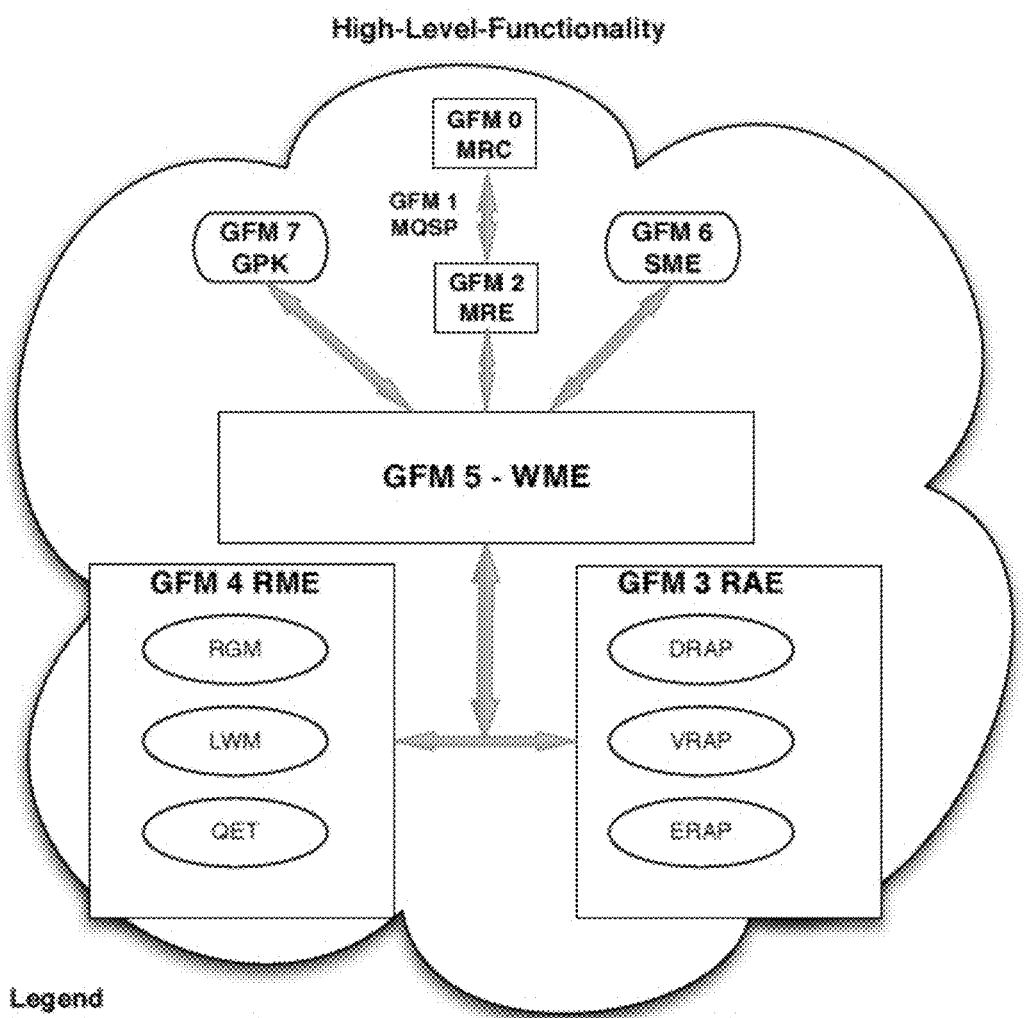
FIG. 6 provides a visual representation of the high level components of the disclosed E-MoG

One embodiment of the E-MoG is shown in FIG. 6, which displays the invention's high level components. In this one embodiment, the E-MoG mechanisms as described herein are extended to support scalable mission-critical mission processing services ranging from Mobile Collaborative Services Grid Services all the way to full-blown Collaborative Mobile Mission Processing Services (MCMPS). Comprising this one embodiment of the present E-MoG invention are the following high-level functional subcomponents.

GFM0—MRC: The Mission Request Client
GFM1—MQSP: Mission Service Quality profile Specification Protocol
GFM2—MRE: Mission Request coordinating Engine
GFM3—RAE: Resource Assessment Engine
  RGM: Resource Guarantee Management Function
  LWM: Low-level Workflow Management-guarantee function
  QET: Service Quality Efficiency Tradeoff Function
GFM4—RME: Resource Management Engine
  DRAP: Direct Resource Availability Profile function
  VRAP: Virtual Resource Availability Profile function
  ERAP: Environmental Resource Availability Profile function
GFM5—WME: Workflow Management Engine
GFM6—SME: Security Management Engine
GFM7—GPK: Global Performance Knowledge System Defining a mission on the E-MoG is coordinated between a Mission Request Client (MRC)—GFM0, and GFM5, i.e. the WME Workflow Management Engine through the Mission Request Coordination Engine (MRE). The WME is a set of identically distributed software (middleware) mechanisms (i.e. distributed among multiple MHs) or processes for coordinating the functions of the WME. Both mechanisms and modules are defined, with modules being defined within mechanisms.

In this present embodiment of the E-MoG, the E-MoG's Workflow Management Engine (WME) as depicted in FIG. 5, is further comprised of functional components named as follows:

M5-1: MAWAM, module number M5-1: Mission Action Workflow Assembly Mechanism
M5-2: CEM, module number M5-2: Checkpoint Exchange Messaging Mechanism
M5-3: MCI, module number M5-3: Multiple Clusters Interface Mechanism
M5-4: MSRE, module number M5-4: Mission Subtask Results Exchange Mechanism
M5-5: PRMT, module number M5-5: Phenomena Remoteness Management Tracking Mechanism
M5-6: SIPM, module number M5-6: Schedule in Place Mechanism
M5-7: SJMA, module number M5-7: Settable Job Max-time Abort Mechanism M5-1: Mission Action Workflow Assembly Mechanism (MAWAM): In the present embodiment of the E-MoG, the E-MoG's Workflow Management Engine (WME), module GFM5, being further comprised to include the component and/or sub-mechanism, i.e. M5-1, referred to as the Mission Action Workflow Assembly Mechanism (MAWAM), where the MAWAM (M5-1) is further comprised of functionality such that the Mission Definition, i.e. the Mission Parameters are facilitated for the WME. Said mission parameters are facilitated through the WME through the MAWAM's software and hardware interaction, with the potential of hardware in the loop interaction, via the MAWAM's coordination with GFM2, i.e. the MRE: Mission Request coordination Engine, so as to define and describe the mission, i.e. the mission WBS: Work Breakdown Structure (See FIG. 2), including mission subtasks, subtask dependencies, mission profiles, and mission service qualities (QoS). The functionality of M5-1, i.e. the MAWAM, also includes a distributed data structure, i.e. referred to as DM-1: Data Structure, which provides for replicated and distributed storage of the Mission Definition.

M5-1-1: Mission Simulation Predictor Mechanism (MSP): Sub-mechanism of GFM5's M5-1 module: Said module, i.e. M5-1 (MAWAM), is further comprised of functionality such that it facilitates through software and hardware interaction, with the potential for hardware-in-the-loop, Acceptance of Initial Mission Definition for simulation and Mission tuning from M5-1. MSP simulates mission with respect to Computation, Communications, and Physical conditions under varying degrees of stress, then either makes recommendations for fine tuning of the mission (to the human mission planner via GFM2), or if permitted by authorization, it automatically makes the mission tuning adjustments to the mission profile, and/or WBS.

M5-1-2: Mission WBS Flow Priorities Mechanism (MWFPM): Sub-mechanism of GFM5's M5-1 module: Said module, i.e. M5-1 (MAWAM), is further comprised of functionality such that it facilitates through software and hardware interaction, with the potential of hardware-in-the-loop, the establishment of priorities for important mission subtasks and mission subtask produced data results and results residue flows, based upon the fine-tuned mission definition established by M5-1. Works interactively and iteratively with M5-1 to fine tune the mission, e.g. Mission subtasks that have more incoming or outbound dependencies may be assigned a higher priority in the WBS, with respect to replication of the subtask or its resultant data, or the subtask's scheduled checkpoint frequency, or the subtask's scheduled checkpoint exchange frequency with other subtasks and/or nodes, or the subtask's scheduled resultant data forwarding frequency, or the scheduled caching of the subtask's checkpoint data or resultant data. The portion of the physical subtask result progress, and left for a replacement subtask to finish and or attempt to finish, is termed the programmatic residue, or simple the residue.

M5-1-3: RAE Interface Mechanism (RIM): Sub-mechanism of GFM5's M5-1 module: Said module, i.e. M5-1 (MAWAM), is further comprised of functionality such that it facilitates through software and hardware interaction, with the potential for hardware-in-the-loop, communication and coordination with GFM3, i.e. the RAE: Resource Assessment Engine, and with M5-1 to provide the temporal resource assessment profile used in decision making and mission simulation predictions, while considering resources as broadly defined.

M5-1-4: Mission Information Profiler Mechanism (MIP): Sub-mechanism tool of GFM5's M5-1 module: Said module, i.e. M5-1 (MAWAM), is further comprised of functionality such that it facilitates through software and hardware interaction, with the potential for hardware-in-the-loop and real-time adjustment, coordination of the Mission Information Profile for the Mission. MIP works interactively with M5-1 to facilitate Mission Definition through the establishment of information profile impact, used in decision making and mission simulation predictions. MIP is capable of command and capture of data to improve the heuristics utilized. MIP is further comprised such that it includes the following functional components described below.

M5-1-4-1: Profile-MSD Module (P-MSD): Sub-mechanism of M5-14, i.e. MIP, such that M5-1-4, MIP is further comprised of functionality such that it facilitates through software and hardware interaction, with the possibility of hardware-in-the-loop, an establishment by mission time slot, and by locations and conditions of each node, the Mission State Description (MSD) including both uncertainty and tolerance parameters. The Mission State Description: MSD: describes each state of the mission by time slot, node location(s) and/or condition. Illegal mission state sequences can be manually and/or automatically scanned for.

M5-1-4-2: Profile-TVI Module (P-TVI): Sub-mechanism of M5-1-4, i.e. MIP, such that M5-1-4, MIP is further comprised of functionality such that it facilitates through software and hardware interaction, with the possibility of hardware-in-the-loop, an establishment of value, or time value of information, by mission time slot, and by locations and conditions of each node, and rate of information flow, and information class delivery of information, including both uncertainty and tolerance parameters.

M5-1-4-3: Profile-HFI Module (P-HFI): Sub-mechanism of M5-1-4, i.e. MIP, such that M5-1-4, MW is further comprised of functionality such that it facilitates through software and hardware interaction, with the possibility of hardware-in-the-loop, an establishment and/or specification of human factors interaction (HFI) and/or human factors requirements, by mission time slot, and by locations and conditions of each node, and rate of information flow, and information class delivery of information, including both uncertainty and tolerance parameters. HFI allows specification of what the factors are, the factor durations, and how human factors information is presented including both uncertainty and tolerance parameters. This also may include client interaction, and cloud/wired grid interaction.

M5-1-4-4: Profile-ISL Module (P-ISL): Sub-mechanism of M5-1-4, i.e. MW, such that M5-1-4, MIP is further comprised of functionality such that it facilitates through software and hardware interaction, with the possibility of hardware-in-the-loop, an establishment by mission time slot, by location, and by condition, the Information Securability Level (ISL), including both uncertainty and tolerance parameters. Definition of Securability Level: the ability to be secured.

M5-1-4-5: Profile-IMP Module (P-IMP): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Probabilistic Impact of Certain Specified Information—including both uncertainty and tolerance parameters. Information may have an impact during certain time slots, locations, and conditions that is different from that during other time slots, locations, and conditions.

M5-1-4-6: Profile-TDP Module (P-TDP): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Probabilistic Impact of just-in-time decision point temporal adjustments (for temporal decision points) including both uncertainty and tolerance parameters.

M5-1-4-7: Profile-PIA Module (P-PIA): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Probabilistic Degree to which information is Actionable (actionable—potential for information to be immediately useful in the mission, potential that information is actionable PIA) in accordance with mission definition—including both uncertainty and tolerance parameters.

M5-1-4-8: Profile-DRR Module (P-DRR): Sub-mechanism of M5-1-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the Probabilistic Degree of Required Reflexivity in accordance with mission definition including both uncertainty and tolerance parameters. Reflexivity is the ability of the E-MoG system to automatically react, so as to adjust its resolution or service quality (QoS) to meet established quality requirements. This reaction may include everything from sensor adjustment to repositioning of mobile hosts, to running sub-missions in support of the overall mission so as to improve the QoS being delivered.

M5-1-4-9: Profile-RPC Module (P-RPC): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the predicted probability of Remote Phenomena Capture—in accordance with the mission definition and predicted environmental factors, including both uncertainty and tolerance parameters. During the mission, the E-MoG may be able to follow with agility, a complexly and dynamically varying phenomena or a phenomena that is remote in other ways. The RPC module describes by time slot, location, and condition, the probability of tracking the phenomena in question.

M5-1-4-10: Profile-IEL Module (P-IEL): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the recommended Information Exchange Level and from whom to whom in accordance with mission definition and predicted environmental factors including both uncertainty and tolerance parameters. To facilitate the mission, intermediate messages are exchanged between nodes, and/or mobile nodes, and between publisher (processes) and subscriber (processes) being executed by and on board these nodes and/or mobile nodes. In addition to data messages, messages can be physical in nature, and exchanged physically.

M5-1-4-11: Profile-IIP Module (P-IIP): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the predicted Information Innovativeness Probability in accordance with mission definition and predicted environmental factors, including both uncertainty and tolerance parameters. Innovativeness is that quality of information that renders it new to the receiver, and hence innovativeness is relative to both the information being received and the receiver of the information. The transmission of information that is new to most receivers is comparatively more efficient that the transmission of information that is not new, or less new.

M5-1-4-12: Profile-ISC Module (P-ISC): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the predicted Information Storage Cost in accordance with mission definition and predicted environmental factors, including both uncertainty and tolerance parameters.

M5-1-4-13: Profile-IPC Module (P-IPC): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the predicted Information Processing Cost in accordance with mission definition and predicted environmental factors, including both uncertainty and tolerance parameters.

M5-1-4-14: Profile-PEC Module (P-PEC): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Predicted Energy Consumption in accordance with mission definition and predicted environmental factors, including both uncertainty and tolerance parameters.

M5-1-4-15: Profile-PEP Module (P-PEP): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Predicted Energy Production in accordance with mission definition and predicted environmental factors, including both uncertainty and tolerance parameters.

M5-1-4-16: Profile-PES Module (P-PES): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Predicted Energy Surplus in accordance with mission definition and predicted environmental factors, including both uncertainty and tolerance parameters.

M5-1-4-17: Profile-PET Module (P-PET): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Predicted Energy Transfer in accordance with mission definition and predicted environmental factors, including both uncertainty and tolerance parameters.

M5-1-4-18: Profile-RAP Module (P-RAP): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the predicted Resource Availability Profile in accordance with mission definition and predicted environmental factors, including both uncertainty and tolerance parameters (with resource broadly defined).

M5-1-4-19: Profile-IAL Module (P-IAL): Sub-mechanism of M5-1-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the predicted Information Accuracy versus Latency tradeoff profile in accordance with mission definition and predicted environmental factors, including both uncertainty and tolerance parameters (with resource broadly defined).

M5-1-4-20: Profile-IDD Module (P-IDD): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Information Depreciation Degree in accordance with mission definition and predicted environmental factors, including both uncertainty and tolerance parameters (with information broadly defined).

M5-1-4-21: Profile-IDL Module (P-IDL): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Information Disorder Level in accordance with mission definition and predicted environmental factors, including both uncertainty and tolerance parameters (with information broadly defined).

M5-1-4-22: Profile-IFP Module (P-IFP): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Information Fusibility Profile in accordance with mission definition and predicted environmental factors, including both uncertainty and tolerance parameters (with information broadly defined).

M5-1-4-23: Profile-POE Module (P-POE): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the Potential Out of order Execution in accordance with mission definition and predicted environmental factors, including both uncertainty and tolerance parameters (with information broadly defined). By rearranging the initially specified order of subtasks, it is possible at times to realize gains in speed and reliability for the mission.

M5-1-4-24: Profile-MMC Module (P-MMC): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the impact of Multiple Mission Contention in accordance with mission definition and predicted environmental factors, for concurrent and overlapping missions on the same clusters of nodes or in cases of connected clusters of nodes, including both uncertainty and tolerance parameters.

M5-1-4-25: Profile-RIV Module (P-RIV): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Relative Information Value node-to-node, in accordance with mission definition and predicted environmental factors, including both uncertainty and tolerance parameters.

M5-1-4-26: Profile-PPP Module (P-PPP): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Predicted Physical Program interaction, node-to-node, in accordance with mission definition and predicted environmental factors, including both uncertainty and tolerance parameters, including consideration of the residue.

M5-1-4-27: Profile-SDQ Module (P-SDQ): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the Sensed Data Quality requirements interaction, node-to-node, in accordance with mission definition and predicted environmental factors, including both uncertainty and tolerance parameters.

M5-1-4-28: Profile-HPP Module (P-HPP): Sub-mechanism of M51-4, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Host Personality Profile, making up the E-MoG, in accordance with mission definition and predicted environmental factors, including both uncertainty and tolerance parameters.

M5-1-4-29: Profile-MSP Module (P-MSP): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the Mission Scale Profile, making up the E-MoG, in accordance with mission definition and predicted environmental factors, including both uncertainty and tolerance parameters.

M5-1-4-30: Profile-QoS Module (P-QoS): Sub-mechanism of M5-14, i.e. MIP, such that M5-1-4, MIP is further comprised of functionality such that it facilitates through software and hardware interaction, with the possibility of hardware-in-the-loop, an establishment by mission time slot, by location and/or node location, and by condition, the Quality Of Service Profile, making up the E-MoG, in accordance with mission definition and predicted environmental factors, including both uncertainty and tolerance parameters.

M5-1-4-31: Profile-MAP Module (P-MAP): Sub-mechanism of M51-4, i.e. MW, such that M5-1-4, MIP is further comprised of functionality such that it facilitates through software and hardware interaction, with the possibility of hardware-in-the-loop, an establishment by mission time slot, by location and/or node location, and by condition, the Mission scheduling Aggressiveness Profile, making up the E-MoG, in accordance with mission definition and predicted environmental factors, including both uncertainty and tolerance parameters.

M5-1-4-32: Profile-CMP Module (P-CMP): Sub-mechanism of M51-4, i.e. MW, such that M5-1-4, MIP is further comprised of functionality such that it facilitates through software and hardware interaction, the Captured Mission Profile log, of the actual mission profile metrics for comparison to, and adjustment of the heuristic prediction model, making up the E-MoG, in accordance with mission definition and predicted environmental factors, including both uncertainty and tolerance parameters.

M5-1-4-33: Profile-AML Module (P-AML): Sub-mechanism of M51-4, i.e. MW, such that M5-1-4, MIP is further comprised of functionality such that it facilitates through software and hardware interaction, an Amdahl's Law Analysis of the Captured Profile Log, both offline and during missions.

M5-1-4-34: Profile-ISM Module (P-ISM): Sub-mechanism of M5-14, i.e. MIP, such that M5-1-4, MIP is further comprised of functionality such that it facilitates through software and hardware interaction, an analysis of the Captured Mission Profile Log for illegal mission states or state sequences.

M5-1-5: RME Interface Mechanism (MIP): Sub-mechanism of GFM5: Said module, i.e. GFM5, is further comprised of functionality such that it facilitates through software and hardware interaction, with the potential for hardware-in-the-loop and real-time adjustment, the RME Interface Mechanism for GFM5 (the WME—Workflow Management Engine), which involves communication and coordination with GFM4, i.e. the RME: Resource Management Engine, and with M5-1 to provide the temporal resource management profile used in both the actual mission orchestration and mission simulation predictions, considering resources as broadly defined.

M5-2: CEM Checkpoint Exchange Messaging Mechanism (MIP): Sub-mechanism of GFM5: Said module, i.e. GFM5, is further comprised of functionality such that it facilitates through software and hardware interaction, with the potential for hardware-in-the-loop and real-time adjustment, the CEM, Checkpoint Exchange Mechanism, causing the periodic exchange of checkpoint data messages with controllable piggyback add-on messages to facilitate RAE and RME, i.e. DRAP, VRAP, ERAP, RGM, LWM, and QET (Quality Efficiency Tradeoff) mechanisms. Capable of handling multi-furcated flows. Frequency of checkpoint exchange can be given priority for mission subtasks in need of same. Granularity between checkpoints is controllable.

M5-3: MCI Multiple Clusters Interface Mechanism (MCI): Sub-mechanism of GFM5: Said module, i.e. GFM5, is further comprised of functionality such that it facilitates through software and hardware interaction, with the potential for hardware-in-the-loop and real-time adjustment, the interconnection of mission coordination among multiple E-MoG Mission clusters. Profile is provided to this mechanism from M5-1, to determine by time slot, location, and condition, the character of the Multiple-cluster Interface, in accordance with mission definition and predicted environmental factors, including both uncertainty and tolerance parameters.

M5-4: MSRE Mission Subtask Results Exchange Mechanism (MSRE): Sub-mechanism of GFM5: Said module, i.e. GFM5, is further comprised of functionality such that it facilitates through software and hardware interaction, with the potential for hardware-in-the-loop and real-time adjustment, to cause mission subtask results transmission and forwarding, whose frequency and repetition is determined in coordination with the QET (i.e. the Quality Efficiency Tradeoff) function, and depends on the size of the transmission versus the time and processing effort require to produce the data and transmission by the Mission Subtask producing same.

M5-5: PRMT Phenomena Remoteness Management Tracking Mechanism Mission (PRMT): Sub-mechanism of GFM5: Said module, i.e. GFM5, is further comprised of functionality such that it facilitates through software and hardware interaction, with the potential for hardware-in-the-loop and real-time adjustment, which evaluates the degree to which a current phenomenon or object can potentially be tracked by the E-MoG. Coordinates with WME, RAE, and RME in the performance of this function.

M5-6: SPIM Schedule in Place Mechanism (SPIM): Sub-mechanism of GFM5: Said module, i.e. GFM5, is further comprised of functionality such that it facilitates through software and hardware interaction, with the potential for hardware-in-the-loop and real-time adjustment, which evaluates the probability to which subscriber subtasks should be scheduled on the same hosts as their publishing subtasks. Probability of same host scheduling may be determined by a number of factors, including network topology, network communications reliability and congestion, and available resources.

M5-7: SJMA Settable Job Max-time Abort Mechanism (SJMA): Sub-mechanism of GFM5: Said module, i.e. GFM5, is further comprised of functionality such that it facilitates through software and hardware interaction, with the potential for hardware-in-the-loop and real-time adjustment, such that it aborts the Mission or recommends an abort of the mission, should some mission subtask or subtask(s) not be completed in sufficient replicated numbers to make completion of the mission within the defined QoS parameters possible.

M3: Resource Assessment Engine (RAE): In this one embodiment of the present invention, i.e. the E-MoG, refer to FIG. 5, showing the invention's high-level components. Determining the available resources (broadly defined), the Resource Assessment Engine (GFM3) communicates with and works with GFM5, i.e. the WME Workflow Management Engine so as to dynamically apprise the WME of resources (broadly defined) available to the mission. The RAE is a set of identically distributed software (middleware) mechanisms (i.e. distributed among multiple Mobile Nodes or Mobile Hosts) or processes for coordinating RAE functions as described further in subsections of M3.

In this present embodiment of the E-MoG, the E-MoG's Resource Assessment Engine (RAE) is further comprised of functional components as follows:

M3-1: DRAP, module number M3-1: Direct Resource Availability Profile Function

M3-2: RAP, module number M3-2: Virtual Resource Availability Profile Function

M3-3: ERAP, module number M3-3: Environmental Resource Availability Profile Function M3-1: Direct Resource Availability Profile function (DRAP): Sub-mechanism of GFM3: Said module, i.e. GFM3, is further comprised of functionality such that it facilitates through software and hardware interaction, with the potential for hardware-in-the-loop and real-time adjustment, the reporting of resources, i.e. CPU cycles, computer memory, process queue, communications queue, data cache content, residue information cache content, battery, sensors, actuators (arms, grabbers, probes, weapons, etc.), specific to the local mobile host or mobile node only.

M3-1-1: Node Main Resource Module (NMR-D): Sub-mechanism of GFM3: Said module, i.e. GFM3, is further comprised of functionality such that it facilitates through software and hardware interaction, with the potential for hardware-in-the-loop and real-time adjustment, the storage of the most recent report of node (i.e. host) location, velocity, acceleration, heading, orientation, antenna orientation, on-board sensors, on-board actuators, self-mobility capability, CPU cycles, computer type and memory, execution queue, communications queue, communications capability, RLNC (Random Linear Network Coding) working set of accumulated packets, results data cache, results residue information cache, battery capacity and other local power resources, locally in memory on the same node. Through this mechanism, a mobile node becomes aware of its own resources and the status of those resources.

M3-1-2: Publisher Visibility Status Module (PVS-D): Sub-mechanism of GFM3: Said module, i.e. GFM3, is further comprised of functionality such that it facilitates through software and hardware interaction, with the potential for hardware-in-the-loop and real-time adjustment, local records, i.e. local to a node running a given work flow subtask, the visibility of publisher Mission Subtasks, to the currently running or preparing to run local mission subtask(s), based on received Checkpoint Piggyback Messages. If publishers are not visible based upon received messages, and publisher results data and/or results residue is not visible, then potentially the currently running subtask(s) or preparing to run subtask(s) may not succeed in getting input data and/or input residue it needs to run and hence may not succeed to deliver its results.

M3-1-3: Publisher Results-data/Results-residue Visibility Status Module (PRVS-D): Sub-mechanism of GFM3: Said module, i.e. GFM3, is further comprised of functionality such that it facilitates through software and hardware interaction, with the potential for hardware-in-the-loop and real-time adjustment, local records, i.e. local to a node running a given work flow subtask, the visibility of publisher Mission Subtask's, publisher's results data and/or results residue, from the perspective of the local node (and its associated pre-start or running Mission subtask(s)). If a Mission Subtask's publishers are not visible, either locally or in the Node's neighborhood, then potentially the currently running subtask(s) or preparing to run subtask(s) may not succeed in getting the input data or input residue, or in building upon the input residue it needs to run and hence, may not succeed to deliver its own results data or residue to its subscribers. Communications of these reports is via Checkpoint Piggyback Messages (CPM).

M3-1-4: Subscriber Visibility Status Module (SVS-D): Sub-mechanism of GFM3: Said module, i.e. GFM3, is further comprised of functionality such that it facilitates through software and hardware interaction, with the potential for hardware-in-the-loop and real-time adjustment, local records, i.e. local to a node running a given work flow subtask, the visibility of subscriber Mission Subtasks (in queue), to the currently running or preparing to run local mission subtask(s), based on received Checkpoint Piggyback Messages. If subscribers are not visible based upon received messages, then the currently running subtask(s) or preparing to run local Mission subtask(s) may not be able to complete its function, i.e. that of delivering its processed result to its subscriber(s).

M3-1-5: Subscriber Results-data/Results-residue Visibility Status Module (SRVS-D): Sub-mechanism of GFM3: Said module, i.e. GFM3, is further comprised of functionality such that it facilitates through software and hardware interaction, with the potential for hardware-in-the-loop and real-time adjustment, local records, i.e. local to a node running a given work flow Mission subtask, the local cache of subscriber Mission Subtasks produced Results data, or information about results-residue. If subscriber produced data or results and/or information about residue results are available in cache in sufficient numbers, the current Mission subtask, observing this availability may not need to be started or replicated. Communications of these reports is via Checkpoint Piggyback Messages (CPM).

M3-1-6: Mission Subtask Status Module (MSS-D): Sub-mechanism of GFM3: Said module, i.e. GFM3, is further comprised of functionality such that it facilitates through software and hardware interaction, with the potential for hardware-in-the-loop and real-time adjustment, the storage of the most recent status of the local (local to this node) mission subtask(s) for subtask(s) in the execution queue. Through this mechanism, a mobile host (node) becomes aware of the status of each Mission subtask in its current execution queue. This status is reported to other or like subtasks on neighboring nodes. The information is used in decision making in regards to replication of mission subtasks on nodes.

M3-1-7: Local Mission Subtask Results Data Module (LMSR-D): Sub-mechanism of GFM3: Said module, i.e. GFM3, is further comprised of functionality such that it facilitates through software and hardware interaction, with the potential for hardware-in-the-loop and real-time adjustment, the local caching of the Local Mission Subtask Results data and/or information about the results residue. This data and/or residue information can be reported to needing subtasks, and/or forwarded to requesting subtasks, or used by needing subtasks, or stored to be rebroadcast latter when more subscribers may be listening, or when communications conditions are favorable.

M3-1-8: Direct Uncertainty and Information Derating Module (UID-D): Sub-mechanism of GFM3: Said module, i.e. GFM3, is further comprised of functionality such that it facilitates through software and hardware interaction, with the potential for hardware-in-the-loop and real-time adjustment, the derating of local, i.e. on the current local node, reported information status and resources information, based upon whether or not the reporting subsystem or data is old, comes from a distant location, or is in a substandard state.

M3-2: Virtual Resource Availability Profile function (VRAP): Sub-mechanism of GFM3: Said module, i.e. GFM3, is further comprised of functionality such that it facilitates through software and hardware interaction, with the potential for hardware-in-the-loop and real-time adjustment, neighboring node resource reports, about neighboring node resources (called Virtual Resources), and what nodes have them. These reports are propagated in the E-MoG, and include for example, but not limited to this example, reports of resources, i.e. CPU cycles, computer memory, process queue, communications queue, data cache content, residue information cache content, battery, sensors, actuators (arms, grabbers, probes, weapons, etc.), from neighboring nodes.

M3-2-1: Topology Assessment Module (TAM-V): Sub-mechanism of GFM3: Said module, i.e. GFM3, is further comprised of functionality such that it facilitates through software and hardware interaction, with the potential for hardware-in-the-loop and real-time adjustment, such that it determines and reports via Checkpoint Piggyback Message (CPM) and Heart Beat Verification (HBV) reports, the assessed local topology of the E-MoG as seen from neighboring Nodes.

M3-2-2: Node Main Resources Module (NMR-V): Sub-mechanism of GFM3: Said module, i.e. GFM3, is further comprised of functionality such that it facilitates through software and hardware interaction, with the potential for hardware-in-the-loop and real-time adjustment, such that a node reports to other nodes, its most currently stored information pertaining to its location, its location relative to other nodes, its velocity, its velocity relative to other nodes, its acceleration, its acceleration relative to other nodes, its heading or orientation in 3D space, its heading or orientation in 3D space relative to other nodes, its antenna orientation, its antenna orientation relative to the antenna orientation of other nodes, its onboard sensors, its onboard sensors relative to the onboard sensors of other nodes, its onboard actuators and/or tools, its onboard actuators and/or tools relative to other nodes, its self-mobility capability, its self-mobility capability relative to that of other nodes, its available CPU cycles, its available CPU cycles relative to that of other nodes, its computer type and memory, its computer type and memory relative to that of other nodes, its execution queue status, its execution queue status relative to the execution queue statuses of other nodes, its communications queue status, its communications queue status relative to the communications queue statuses of other nodes, its communications capability, its communications capability relative to the communications capabilities of other nodes, its wireless connectivity strength to its neighbors (in the E-MoG), its wireless connectivity strength to its neighbors (in the E-MoG) relative to other nodes, its RLNC working set, its RLNC working set relative to the RLNC working set of other nodes, its subtask results data cache content list, its subtask results data cache content list relative to that of other nodes, its subtask results residue information cache content list, its subtask results residue information cache content list relative to that of other nodes, its battery or fuel capacity, its battery or fuel capacity relative to that of other nodes, its local power or energy resources, and its power or energy resources relative to that of other nodes. This is so each node can be aware, not only of its own resources (broadly defined), but the resources of its neighbors (i.e. virtual resources, and virtual resources relative to its own), and the resources of its neighboring nodes, relative to their neighbors, and the status of those resources. In other words, if a certain mobile host needs a resource or relative resource and doesn't have it, it may know where to find it.

M3-2-3: Publisher Visibility Status Module (PVS-V): Sub-mechanism of GFM3: Said module, i.e. GFM3, is further comprised of functionality such that it facilitates through software and hardware interaction, with the potential for hardware-in-the-loop and real-time adjustment, such that it reports the visibility of publisher Mission Subtasks as seen from the reporting node (and its currently running Mission Subtask(s)), to different or like Mission Subtasks on neighboring Nodes. This is so neighboring Mission Subtasks prior to execution or during execution on neighboring nodes can be aware of publisher visibility from the perspective of their neighboring nodes (and their associated Mission Subtasks). Communication of these reports is via Checkpoint Piggyback Messages (CPM) and HBV (Heart Beat Verification) Messages. If a Mission Subtask's publishers are not visible, then potentially the currently running subtask or preparing to run subtask on the reporting Node may not succeed in getting the input data it needs to run and hence may not succeed to deliver its results to its subscribers. This way, Mission Subtasks running or preparing to run on local Nodes, may be aware of other Mission Subtasks preparing to run or running on neighboring Nodes that may be in jeopardy of failing.

M3-2-4: Publisher Results-data/Results-residue Visibility Status Module (PRVS-V): Sub-mechanism of GFM3: Said module, i.e. GFM3, is further comprised of functionality such that it facilitates through software and hardware interaction, with the potential for hardware-in-the-loop and real-time adjustment, such that it reports the visibility of publisher Mission Subtask results data and/or results residue, as seen from the reporting Node (and its currently running Mission Subtask(s)), to different or like Mission Subtasks on neighboring Nodes. This is so neighboring Mission Subtasks prior to execution or during execution on neighboring Nodes can be aware of publisher results data and/or results residue visibility from the perspective of their neighboring Nodes (and their associated Mission Subtasks). Communications of these reports is via Checkpoint Piggyback Messages (CPM) and Heart Beat Verification (HBV) messages. If a mission Subtask's publishers are not visible, and its publisher results data and/or results residue is not visible, then potentially the currently running subtask or preparing to run subtask on the reporting Node may not succeed in getting the input data and/or residue it needs to run and hence may not succeed to deliver its own results data or residue to its subscribers. This way Mission Subtasks running or preparing to run on local Nodes may be aware of other Mission Subtasks preparing to run or running on neighboring Nodes that may be in jeopardy of failing.

M3-2-5: Subscriber Visibility Status Module (SVS-V): Sub-mechanism of GFM3: Said module, i.e. GFM3, is further comprised of functionality such that it facilitates through software and hardware interaction, with the potential for hardware-in-the-loop and real-time adjustment, such that it reports the visibility of subscriber Mission Subtasks as seen from the reporting Node (and its currently running Mission Subtask), to different or like Mission Subtasks on neighboring Nodes. This is so neighboring Mission Subtasks prior to execution or during execution on neighboring Nodes can be aware of subscriber visibility from the perspective of their neighboring Nodes (and associated Mission Subtasks). Communications of these reports is via Checkpointing Piggyback Messages (CPM) and Heart Beat Verification (HBV) messages. If a Mission Subtask's subscribers are not visible, then potentially the currently running subtask or preparing to run subtask on the reporting Node may not succeed even if it were to produce results for transmission to subscribers. This way Mission Subtasks running or preparing to run on local Nodes may be aware of other Mission Subtasks running or preparing to run on neighboring Nodes that may be in jeopardy of failing before they even start.

M3-2-6: Subscriber Results-data and/or results Residue Visibility Status Module (SRVS-V): Sub-mechanism of GFM3: Said module, i.e. GFM3, is further comprised of functionality such that it facilitates through software and hardware interaction, with the potential for hardware-in-the-loop and real-time adjustment, such that it reports the visibility of subscriber Mission Subtask results data and/or results residue as seen from the reporting Node (and its currently running Mission Subtask), to different or like Mission Subtasks on neighboring Nodes. This is so local Mission Subtasks prior to execution or during execution on neighboring Nodes can be aware of subscriber results data visibility from the perspective of their neighboring Nodes (and their associated Mission Subtasks). Communications of these reports is via Checkpoint Piggyback Messages (CPM) and HBV Messages. If a Mission Subtask's subscriber data and/or subscriber residue is visible in sufficient amount in the neighborhood, then potentially the currently running subtask or preparing to run subtask on the reporting Node may not need to run, and could be terminated or removed from the execution queue early. On the other hand, if a Mission Subtask's subscriber data and/or its subscriber residue is not sufficiently visible, then more replication may be allowed on the given local Mission Subtask.

M3-2-7: Mission Subtask Status Module (MSS-V): Sub-mechanism of GFM3: Said module, i.e. GFM3, is further comprised of functionality such that it facilitates through software and hardware interaction, with the potential for hardware-in-the-loop and real-time adjustment, such that it reports the most recent status of the reporting mission subtasks for all subtasks in the execution queue. Through this mechanism, local Nodes become aware of the status of each Mission Subtask on neighboring Nodes. This way allows a local Node to cancel or do early termination of Mission Subtasks in queue if sufficient status to be successful is indicated about the same original or replicated Mission subtasks at Neighboring Nodes, or if dependent original or replicated dependent subtasks report sufficient status to be successful at Neighboring Nodes, or to allow greater levels of replication at the local Node if sufficient status of local Node's current subtasks or its dependent subtasks is not seen in reports from neighboring Nodes.

M3-2-8: Local Mission Subtask Results data Module (LMSR-V): Sub-mechanism of GFM3: Said module, i.e. GFM3, is further comprised of functionality such that it facilitates through software and hardware interaction, with the potential for hardware-in-the-loop and real-time adjustment, such that it reports visibility of Local Mission Subtask results data from the perspective of the local Node to neighboring Nodes (and their associated mission subtasks).

Through this mechanism, local Nodes become aware of the visibility of subtask results that would ensue from the Mission Subtasks preparing to run or currently running on neighboring Nodes. This way allows a local Node to cancel or do early termination of any pertinent Mission Subtasks in queue if sufficient replication of results data or results residue or if sufficient storage of results data or results residue at results subscribers is indicated via the report, or to allow more replication of the local subtask or results data or results residue in results data or results residue is not sufficiently replicated or available in the neighborhood.

M3-2-9: Virtual Uncertainty and Information Derating Module (UID-V): Sub-mechanism of GFM3: Said module, i.e. GFM3, is further comprised of functionality such that it facilitates through software and hardware interaction, with the potential for hardware-in-the-loop and real-time adjustment, such that it derates reported information about status and resources from neighboring Nodes, based on the distance to the Node from where the reported information came and the age of the reported information. Received reports whose origin is a greater distance away, or whose age is greater are considered to be less credible and thus derated more.

M3-2-10: Entropic Leading Indicator Module (ELI-V): Sub-mechanism of GFM3: Said module, i.e. GFM3, is further comprised of functionality such that it facilitates through software and hardware interaction, with the potential for hardware-in-the-loop and real-time adjustment, such that it collects reports from neighboring Nodes about the entropy of their packet transmission queues so as to use this queue entropy information as an early detection of neighborhood broadcast congestion buildup. This information is use to throttle neighborhood packet transmissions during missions, by the MTAM (Mission Transmission Adjustment Mechanism).

M3-3: Environmental Resource Availability Profile function (ERAP): Sub-mechanism of GFM3: Said module, i.e. GFM3, is further comprised of functionality such that it facilitates through software and hardware interaction, with the potential for hardware-in-the-loop and real-time adjustment, neighboring node resource reports, about resources available in the environment, not on a Node or Nodes (called Environmental Resources), and where and/or when or under what conditions they might be found. These reports are propagated in the E-MoG, and include for example, but not limited to environmental energy resources (e.g. sunshine for charging via solar voltaic arrays), information resources (e.g. directions via signs, or the availability of a communications link), tools, or a phenomenon that should be tracked, or places to hide, to name a few.

M3-3-1: Environmental Resource Availability Profile function (HMR-E): Sub-mechanism of GFM3: Said module, i.e. GFM3, is further comprised of functionality such that it facilitates through software and hardware interaction, with the potential for hardware-in-the-loop and real-time adjustment, reports of most recent pertinent Node resources relative to objects or phenomena in the environment. Also reports the direction and nature of mission relevant objects, relative to resources of neighbors (and their relative or virtual resources) and environmental resources, relative to resources of neighbors (and their relative or virtual resources), directly to the local Node and to neighboring Nodes.

M3-3-2: Environmental Uncertainty and Information Derating Module (UID-E): Sub-mechanism of GFM3: Said module, i.e. GFM3, is further comprised of functionality such that it facilitates through software and hardware interaction, with the potential for hardware-in-the-loop and real-time adjustment, such that it derates reported environmental information originating from neighboring Nodes based upon both the distance to the report originating Node and the age of the report. Reports originating from a greater distance and/or having a greater age are considered less credible.

M4: Resource Management Engine (RME): In this one embodiment of the present invention, i.e. the E-MoG, refer to FIG. 6, showing the invention's high-level components. Managing the available resources (broadly defined), the Resource Management Engine (GFM4) communicates with and works with GFM5, i.e. the WME Workflow Management Engine so as to dynamically manage the resources (broadly defined) available to the mission. The RME is a set of identically distributed software (middleware) mechanisms (i.e. distributed among multiple Mobile Nodes or Mobile Hosts) or processes for coordinating RME functions as described further in subsections of M4.

M4-1: Resource Guarantee Management Mechanism (RGM): Sub-mechanism of GFM4: Said module, i.e. GFM4, is further comprised of functionality such that it facilitates through software and hardware interaction, with the potential for hardware-in-the-loop and real-time adjustment, such that it ensures that resources are managed such that they adequately support the mission in accordance with mission parameters within uncertainty and tolerance parameters.

M4-1-1: Resource Acquisition and Release Module (RAR): Sub-mechanism of GFM4: Said module, i.e. GFM4, is further comprised of functionality such that it facilitates through software and hardware interaction, with the potential for hardware-in-the-loop and real-time adjustment, such that it acquires resources (broadly defined), i.e. movable arms (location, velocity, acceleration), locomotion (location, velocity, acceleration), by temporal resource profile overlay, and releases or partially releases resources by adjusting to a lesser temporal resource profile overlay. The overlay is necessary because the resource could be serving multiple missions or multiple mission functions.

M4-1-2: Failure Prediction needs Module (FPM): Sub-mechanism of GFM4: Said module, i.e. GFM4, is further comprised of functionality such that it facilitates through software and hardware interaction, with the potential for hardware-in-the-loop and real-time adjustment, such that it assesses the probability of failure of other Node's Mission Subtasks based upon received CPM (Checkpoint Piggyback Messages). Failure is defined as: Lack of visibility of Mission Subtask publishers and publisher data and/or publisher residue, or no visible Mission subtask subscribers with no visible subscriber data and/or subscriber residue, and a lower threshold of visible peer mission subtasks. The FPM uses the Quality of Service (QoS) profile specified by the WME to assess whether the failure is severe enough to require further coordination with the RSM (Replica Success Module), then it coordinates with the RSM to determine whether or not replicas should be scheduled.

M4-1-3: Replica Success Module (RSM): Sub-mechanism of GFM4: Said module, i.e. GFM4, is further comprised of functionality such that it facilitates through software and hardware interaction, with the potential for hardware-in-the-loop and real-time adjustment, such that it assesses the probability that a prospective Mission Subtask replica will be successful if scheduled at the planned time, based upon visibility of publisher subtasks, or publisher data and/or publisher residue, and subscribers from the perspective of the prospective Node considered for execution of the prospective Mission Subtask replica. Coordinates with the WME with respect to the required QoS, and with the QET mechanism (RPDT and RMT Modules) as to the appropriate tradeoff between accuracy and speed versus latency, energy, and aggressiveness with which to plan the scheduling of replica Mission Subtasks. The decision is made at the checkpoint-receiving Node as to whether or not to replicate the mission subtask. Considers remaining time for the Mission Subtask in question before committing to replicate said Mission Subtask.

M4-1-4: Checkpoint Caching Determination Module (CCDM): Sub-mechanism of GFM4: Said module, i.e. GFM4, is further comprised of functionality such that it facilitates through software and hardware interaction, with the potential for hardware-in-the-loop and real-time adjustment, such that it causes mission subtask checkpoint caching with probability of caching being determined in accordance with the WME's specified QoS in coordination with RAE and QET. And that probability partially depends on its size of the checkpoint versus the time and processing effort required by the Mission Subtask to produce it.

M4-1-5: Mission Subtask Results Data and/or Results Residue Information Caching Determination Module (MSRDCDM): Sub-mechanism of GFM4: Said module, i.e. GFM4, is further comprised of functionality such that it facilitates through software and hardware interaction, with the potential for hardware-in-the-loop and real-time adjustment, such that it causes mission subtask results data and/or results residue information caching whose probability of caching is determined in accordance with the WME's specified QoS in coordination with RAE and QET. And that probability depends on the size of the results data or results residue being cached versus the time and processing effort required by the Mission Subtask to produce it.

M4-1-6: Checkpoint and/or Mission Subtask Results Data and/or Results Residue information Forwarding Module (OFSM): Sub-mechanism of GFM4: Said module, i.e. GFM4, is further comprised of functionality such that it facilitates through software and hardware interaction, with the potential for hardware-in-the-loop and real-time adjustment, such that it causes forwarding of cached checkpoints of mission subtasks or subtask results data or results residue. Probability of forwarding is determined in accordance with the WME's specified QoS in coordination with the RAE and QET and depends on the size of the checkpoint, or results or results residue information at hand versus the time and processing effort required to produce same.

M4-1-7: Retroactive Replica Needs Module (RARNM): Sub-mechanism of GFM4: Said module, i.e. GFM4, is further comprised of functionality such that it facilitates through software and hardware interaction, with the potential for hardware-in-the-loop and real-time adjustment, such that it coordinates with WME (on QoS) based on reports from RAE to assess the need for completion of mission subtasks that should have been completed earlier in the mission. If the need exists and resources are available, then those mission subtasks can be retroactively scheduled to run (again).

M4-1-8: Message Transmission Adjustment Module (MTAM): Sub-mechanism of GFM4: Said module, i.e. GFM4, is further comprised of functionality such that it facilitates through software and hardware interaction, with the potential for hardware-in-the-loop and real-time adjustment, such that based on reports from the RAE and ELI-V mechanisms, this module determines via the WME's QoS and through coordination with QET, the appropriate MABF (Maximum Accumulation Before Forwarding)—called the FIT (Forwarding Information Threshold), and TOP (Transmission Origination Probability) message settings for transmission and forwarding under Random Linear Network Coding (RLNC), to achieve Computationally Augmented, optimally adjusted RLNC. Also adjustable is the number of packets per message, and hence the transmission duration of each packet.

M4-1-9: Mobile Communications Enhancement Module (MCEM): Sub-mechanism of GFM4: Said module, i.e. GFM4, is further comprised of functionality such that it facilitates through software and hardware interaction, with the potential for hardware-in-the-loop and real-time adjustment, such that the module coordinates with the MTAM, and with RAE to determine the degree to which mobility or self-mobility can be exploited to enhance the mission communications profile. Coordinates with the LWM (Low-level Workflow Management module to implement).

M4-1-10: Resource Organization Enhancement Module (ROAM): Sub-mechanism of GFM4: Said module, i.e. GFM4, is further comprised of functionality such that it facilitates through software and hardware interaction, with the potential for hardware-in-the-loop and real-time adjustment, such that it coordinates with QET and LWM to determine the degree to which mobile nodes can move themselves so as to provide enhanced resource organization for the mission.

M4-1-11: Direct Node Ancestry Module (DNAM): Sub-mechanism of GFM4: Said module, i.e. GFM4, is further comprised of functionality such that it facilitates through software and hardware interaction, with the potential for hardware-in-the-loop and real-time adjustment, such that it coordinates with WME based on its required QoS and QET to determine when to trim or curtail the Replication of Processes and Data results Transmissions via the RPDT mechanism.

M4-2: Low-level Workflow Management module (LWM): Sub-mechanism of GFM4: Said module, i.e. GFM4, is further comprised of functionality such that it facilitates through software and hardware interaction, with the potential for hardware-in-the-loop and real-time adjustment, such that it manages locally and in real time or nearly real time, the mission subtask workflows in accordance with mission parameters within uncertainty and tolerance parameters.

M4-2-1: Resource Management Module (RMM): Sub-mechanism of GFM4: Said module, i.e. GFM4, is further comprised of functionality such that it facilitates through software and hardware interaction, with the potential for hardware-in-the-loop and real-time adjustment, such that it schedules the acquired resource profile for actuators, i.e. movable arms (location, velocity, acceleration), locomotion (location, velocity, acceleration), orientation (location, velocity, acceleration), directional antennas (location, velocity, acceleration), communications, and computational scheduling and replication or partial replication of processes or storage. Coordinates with the QET to determine appropriate accuracy and speed versus latency and energy tradeoff.

M4-3: Service Quality Efficiency Tradeoff module (QET): Sub-mechanism of GFM4: Said module, i.e. GFM4, is further comprised of functionality such that it facilitates through software and hardware interaction, with the potential for hardware-in-the-loop and real-time adjustment, such that it evaluates the tradeoff between service quality, available resources and E-MoG system efficiency in the current environment.

M4-3-1: Virtual Checkpoint Approximation Tradeoff module (VCAT): Sub-mechanism of GFM4: Said module, i.e. GFM4, is further comprised of functionality such that it facilitates through software and hardware interaction, with the potential for hardware-in-the-loop and real-time adjustment, such that it coordinates with WME and its required QoS. Based upon a state model of the Mission Subtask, the VCAT module evaluates the appropriate tradeoff between checkpoint accuracy/approximation and latency/QoS specified. It is capable of adjusting this in real-time for the mission. It accomplishes this through control of the job state granularity, and partial replication granularity. Approximate checkpoints are less accurate but may allow for lower subtask or mission latency.

M4-3-2: Caching Aggressiveness Module (CAM): Sub-mechanism of GFM4: Said module, i.e. GFM4, is further comprised of functionality such that it facilitates through software and hardware interaction, with the potential for hardware-in-the-loop and real-time adjustment, such that it evaluates the level of caching aggressiveness of IDI (Intermediate Data results Item) data results, and checkpoints as a tradeoff between storage space and mission QoS specification and real time specification and latency specification.

M4-3-3: Replication of Processes and Data results Transmissions aggressiveness module (RPDT): Sub-mechanism of GFM4: Said module, i.e. GFM4, is further comprised of functionality such that it facilitates through software and hardware interaction, with the potential for hardware-in-the-loop and real-time adjustment, such that it evaluates the level of aggressiveness with respect to the replication of processes and data results as a tradeoff between storage space and mission QoS specification and real time specification and latency specification.

M4-3-4: Resource Management Tradeoff module (RMT): Sub-mechanism of GFM4: Said module, i.e. GFM4, is further comprised of functionality such that it facilitates through software and hardware interaction, with the potential for hardware-in-the-loop and real-time adjustment, such that it coordinates with RMM (Resource Management Module) within the LWM so as to define the appropriate tradeoff between accuracy and speed versus latency and energy for acquired actuator resources; i.e. movable arms (location, velocity, acceleration), locomotion (location, velocity, acceleration), orientation (location, velocity, acceleration), and directional antennas (location, velocity, acceleration).

[0010-3-3-5] M4-3-5: QoS Assessment Module (RMT): Sub-mechanism of GFM4: Said module, i.e. GFM4, is further comprised of functionality such that it facilitates through software and hardware interaction, with the potential for hardware-in-the-loop and real-time adjustment, such that it coordinates with the RME and RAE to assess how the required QoS, specified by the WME is being met.

M4-3-6: Resource Scalability Assessment Module (RSAM): Sub-mechanism of GFM4: Said module, i.e. GFM4, is further comprised of functionality such that it facilitates through software and hardware interaction, with the potential for hardware-in-the-loop and real-time adjustment, such that it works with the RAE and RME to determine if more resources can be acquired toward achieving the specified QoS Temporal Profile.

The invention claimed is:
1. An extended mobile grid comprising:
 a. a collective of interconnected nodes, wherein said nodes comprise at least one resource and wherein such resource is either a direct resource, a virtual resource, or an environmental resource;
 b. decentralized middleware which resides and executes on each of said nodes, such that the at least one resource are collectivized and processed dynamically by said middleware; and
 c. a work breakdown structure comprising a linear-hierarchical workflow of data dependent stages which distributes a plurality of task and subtask to said collective of interconnected nodes, such that each of said task or subtask is mapped onto at least one node;
wherein said middleware comprises a replication subtask component, named a Checkpoint-Assisted Speculative Execution, wherein said replication subtask component is capable of replicating a status of one or more of nodes onto one or more additional nodes in the collective of interconnected nodes such that said replication subtask component determines a degree of replication at the one or more additional nodes;
wherein said determinations of the degree of replication are made by the Checkpoint-Assisted Speculative Execution;
wherein Checkpoint-Assisted Speculative Execution comprises functionality to support Resource-aware Variable Approximate Checkpointing and Resource-aware Approximate Speculative Replication;
wherein each subtask further comprises work breakdown structure subtask interdependencies;
wherein subtask execution priority is granted to the subtask with a greatest number of the work breakdown structure subtask interdependencies
wherein said extended mobile grid is dynamically scalable during a course of the single task or subtask; and
wherein said extended mobile grid is configured to perform low-latency distributed computation-based computer services.

2. The extended mobile grid of claim 1 wherein said nodes are heterogeneous.

3. The extended mobile grid of claim 1 wherein said nodes are wirelessly interconnected.

4. The extended mobile grid of claim 1 wherein said nodes are mobile.

5. The extended mobile grid of claim 1 wherein said work breakdown structure further specifies a unique minimum start and maximum finish time for each of said plurality of subtask and designates each of said plurality of subtasks as a publisher or subscriber.

6. The extended mobile grid of claim 1 wherein said work breakdown structure further comprises a low level scheduler and a resource acquisition and release module, wherein said low level scheduler negotiates said work breakdown structure and said resource acquisition and release module such that said work breakdown structure is mapped onto a set of node resources for collaborative execution.

7. The extended mobile grid of claim 6 wherein said resource acquisition and release module is capable of mapping regularly collaborative said plurality of subtask onto neighboring nodes.

8. The extended mobile grid of claim 1 wherein at least two said task or subtask are mapped onto a single node.

9. The extended mobile grid of claim 1 wherein said work breakdown structure further comprises a workflow management engine.

10. The extended mobile grid of claim 9 wherein said workflow management engine further comprises a workflow assembly mechanism which defines said work breakdown structure.

11. The extended mobile grid of claim 10 wherein said workflow assembly mechanism further comprises at least one mechanism chosen from the group consisting of: a mission simulation predictor mechanism, a mission work breakdown structure flow priorities mechanism, a resource assessment engaging interface mechanism, and a mission information profiler mechanism.

12. The mobile grid of claim 9 wherein said workflow management engine further comprises at least one mechanism chosen from the group consisting of: a checkpoint exchange messaging mechanism, a multiple clusters interface mechanism, a mission subtask results exchange mechanism, a phenomena remoteness management tracking mechanism, a schedule in place mechanism, and a settable job max-time abort mechanism.

13. The mobile grid of claim 9 further comprising a resource assessment engine, which communicates with said workflow management engine so as to dynamically apprise said workflow management engine of said resources available.

14. The mobile grid of claim 13 wherein said resource assessment engine further comprises at least one functional component chosen from the list consisting of a direct resource availability profile function, a virtual resource availability profile function, and an environmental resource availability profile function.

15. The mobile grid of claim 9 further comprising a resource management engine.

16. The mobile grid of claim 15 wherein said resource management engine further comprises at least one mechanism chosen from the group consisting of: a resource guarantee management mechanism, a low-level workflow management mechanism, and a service quality efficiency tradeoff mechanism.

* * * * *